US012745163B2

(12) United States Patent
Aljadeff et al.

(10) Patent No.: US 12,745,163 B2
(45) Date of Patent: Sep. 22, 2026

(54) SYSTEM, METHOD AND UNIT TO SCAN COMMUNICATION CHANNELS

(71) Applicant: SAVERONE 2014 LTD., Petah-Tikva (IL)

(72) Inventors: Daniel Aljadeff, Petah-Tikva (IL); Meir Grossman, Petah-Tikva (IL); Yaakov Shoshan, Petah-Tikva (IL)

(73) Assignee: SAVERONE 2014 LTD., Petach-Tikva (IL)

( * ) Notice: Subject to any disclaimer, the term of this patent is extended or adjusted under 35 U.S.C. 154(b) by 610 days.

(21) Appl. No.: 18/188,783

(22) Filed: Mar. 23, 2023

(65) Prior Publication Data

US 2023/0239775 A1 Jul. 27, 2023

Related U.S. Application Data

(63) Continuation of application No. PCT/IL2021/051160, filed on Sep. 23, 2021.

(60) Provisional application No. 63/082,228, filed on Sep. 23, 2020.

(51) Int. Cl.
*H04W 48/16* (2009.01)

(52) U.S. Cl.
CPC .................................. *H04W 48/16* (2013.01)

(58) Field of Classification Search
CPC ..... H04W 48/16; H04W 64/00; H04W 16/14; H04W 8/005
USPC .......................................................... 455/434
See application file for complete search history.

(56) References Cited

U.S. PATENT DOCUMENTS

| | | | | |
|---|---|---|---|---|
| 10,557,917 B2 | 2/2020 | Shoshan et al. | | |
| 2005/0143091 A1* | 6/2005 | Shapira | H04W 64/00 | 455/456.1 |
| 2008/0119192 A1* | 5/2008 | Miyata | H04W 36/08 | 455/438 |
| 2013/0012229 A1 | 1/2013 | Itagaki et al. | | |
| 2013/0059544 A1 | 3/2013 | Chen et al. | | |
| 2016/0224503 A1 | 8/2016 | Vanoverschelde et al. | | |

OTHER PUBLICATIONS

International Search Report and Written Opinion for PCT Application No. PCT/IL2021/051160, mailed Jan. 24, 2022.

* cited by examiner

*Primary Examiner* — Tanmay K Shah
(74) *Attorney, Agent, or Firm* — PEARL COHEN LLP

(57) ABSTRACT

A method and system for allocating receiving and processing resources for scanning communication channels over a scanning time are provided herein. The method may include the following steps: dividing the scanning time into time slots, wherein at each time slot, allocating an RF receiver to receive signals in a channel selected from a first number of communication channels, and allocating the processor to process signals received in an earlier time slot; assigning a scanning priority to each of the first number of communication channels; scanning, in accordance with the assigned scanning priority, at least one of a second number of communication channels, to detect and process RF signals; processing the received signals and assigning an updated scanning priority to at least one of the first number of communication channels, wherein the assigned scanning priority is dynamically modifiable; and repeating the scanning and the processing with the updated scanning priority.

5 Claims, 8 Drawing Sheets

SYSTEM, METHOD AND UNIT TO SCAN COMMUNICATION CHANNELS

CROSS REFERENCE TO RELATED APPLICATIONS

This application is a Continuation of International Application No. PCT/IL2021/051160 filed on Sep. 23, 2021, which claims the benefit of U.S. provisional patent application No. 63/082,228 filed on Sep. 23, 2020, both are incorporated herein by reference in their entirety.

FIELD OF THE INVENTION

The present invention relates generally to systems for controlling functionalities of a wireless device within a defined volume based on its location, and more particularly to methods for allocating hardware and processing resources for the scanning of communication channels used in such systems.

BACKGROUND OF THE DISCLOSURE

Systems for localizing transmitting devices are known. For example, wireless localization based on RSSI (received Signal Strength Indication) fingerprinting is known. Generally, if the RSSI is high vs. low, relative to a known power level of transmission, this would suggest that the transmitting element and receiver are closer together vs. further apart. Therefore, if the location of the receiver is known, the location of the transmitting element may be deduced using the RSSI of the transmission as received and the known power level of the transmission when it was transmitted.

In respect to localizing wireless devices in a defined volume (e.g., a vehicle or a room), U.S. Pat. No. 10,557,917 titled "System and methods of locating wireless devices in a volume" which is incorporated herein by reference in its entirety, describes a system that receives wireless signals transmitted by wireless devices (e.g., cellular phones), processes those signals, and estimates parameters which are used to locate the wireless device inside the volume.

Those wireless devices typically may operate in a plurality of frequency bands and channels (e.g., tens of frequency channels over a wide spectrum). When this plurality of frequency bands and channels is also combined with a plurality of antennae that the receiver may use to receive the transmitted signals, the result is many communication channels which the system in the vehicle needs to scan in order to receive signals from the wireless device.

The hardware limitations of the RF receiver are often in both the frequency domain and time domain. Typically, it's more expensive to sample signals in vary broadband (e.g., 0.7-6 GHz), sometimes due to the technical and performance challenges that it presents. In other cases, the simultaneous sampling of signals from several antennae requires increased hardware resources.

Moreover, in practical use cases, it may be necessary to locate a plurality of wireless devices operating in that volume what significantly increases the complexity of the communication channels scanning. Typically, the RF receiver has no or has very partial information with respect to the frequency band/channel on which the wireless device may transmit at any given time.

In theory, it could be possible to design such a system that comprises receiving and processing resources for the simultaneous reception and processing of all the communication channels.

However, this system architecture may be expensive and cumbersome. Practical commercial systems comprise one or very few receivers that are switched between the different communication channels (in some cases programmed to the same RF frequency). There is an obvious difference between the supply and demand, or in other words, between the receiving resources and the number of communication channels that need to be scanned.

The prior art fails to teach a method for efficiently scheduling the scanning of a plurality of communication channels by a Wireless Device Location Unit with limited resources.

SUMMARY OF THE INVENTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to one embodiment, a communication channel may refer to the wireless transmission medium used by a mobile wireless device to transmit signals. The communication channel may be characterized by many parameters, where the most important are the center frequency and bandwidth of the transmitted signals, the frequency band and frequency channel used by the transmitter, and the receiving antenna and the RF receiver used to receive the signals in the Wireless Device Location Unit.

Additionally, according to one embodiment, a frequency channel may refer to the RF center frequency and associated bandwidth of the communication channels that may be used by a mobile wireless device to transmit signals. A frequency band may comprise a plurality of adjacent frequency channels.

A communication channel may comprise a plurality of frequency channels and/or bandwidths (i.e., the transmitted signal comprises a plurality of signals each transmitted on a separate frequency channel).

The term "wireless device" or "mobile (communication) device" and similar, as used herein is intended to include but not be limited to any of the following: mobile telephone, smartphone, PDA, smartwatch, wireless modem, PlayStation, iPad, game console, tablet, laptop or another computer terminal, and embedded remote unit.

The wireless devices may communicate via any conventional wired or wireless digital communication means, e.g., via a wired or cellular telephone network or a computer network such as the Internet.

The terms "RF receiver" or "RF receiver chain" and similar, as used herein refers to the hardware and firmware means that may be required but not be limited to perform any of the following: detect, select, amplify, attenuate, filter, mix, demodulate, convert, sample RF signals that may be present at the receiver input. It should be noted that different receivers may perform only part of these functions and/or comprise other functions not listed here, without departing from the scope of the disclosure.

According to some embodiments of the present invention, there is provided a method for allocating receiving and processing resources for scanning communication channels over a scanning time. The method carried out by a wireless device location unit, operable within a system for controlling functionalities (e.g., blocking, limiting, canceling, terminating, stalling, etc.) of a wireless device (e.g., mobile phone, smartphone, tablet, smart watch, etc.) inside a defined volume (e.g., vehicle, room, theater, etc.), wherein said wireless device location unit comprises a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels, and wherein the RF receiver is capable of simultaneously receiving a second number of communication channels which is smaller than the first number of communication channels. The method may include the following steps:

(a) dividing the scanning time into time slots, wherein at each time slot, allocating the RF receiver to receive signals in a channel selected from the first number of communication channels, and allocating the processor to process signals received in an earlier time slot;
(b) assigning a scanning priority to each of the first number of communication channels;
(c) scanning, by the wireless device location unit, in accordance with the assigned scanning priority, at least one of said second number of communication channels, to detect and process RF signals transmitted by the at least one wireless device;
(d) processing, by the processor, the received signals and assigning an updated scanning priority to at least one of the first number of communication channels, wherein the assigned scanning priority is dynamically modifiable by the processor; and
(e) repeating steps (c) and (d) with the updated scanning priority.

According to some embodiments of the present invention, there is provided a method for allocating receiving and processing resources for scanning communication channels over a scanning time. The method carried out by a wireless device location unit, operable within a system for controlling functionalities (e.g., blocking, limiting, canceling, terminating, stalling, etc.) of a wireless device (e.g., mobile phone, smartphone, tablet, smart watch, etc.) inside a defined volume (e.g., vehicle, room, theater, etc.), wherein said wireless device location unit comprises a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels, and wherein the RF receiver is capable of simultaneously receiving a second number of communication channels which is smaller than the first number of communication channels. The method may include the following steps:

(a) dividing the scanning time into time slots, wherein at each time slot, the RF receiver can be allocated to receive signals in a communication channel selected from the first number of communication channels, and the processor can be allocated to process signals received in an earlier time slot;
(b) assigning a scanning priority to each of the first number of communication channels;
(c) selecting at least one communication channel with the highest scanning priority;
(d) allocating the RF receiver to receive RF signals in the selected at least one communication channel;
(e) receiving RF signals in the selected at least one communication channel to detect and process RF signals transmitted by the at least one wireless device;
(f) allocating processing means to process the RF signals received in the selected at least one communication channel;
(g) processing, by the processor, the received signals and assigning an updated scanning priority to the selected at least one communication channel in accordance with the value of at least one parameter calculated by the processor and at least one time-related parameter, wherein the assigned scanning priority is dynamically modifiable by the processor; and;
(h) repeating steps (c) to (g) with the updated scanning priority.

According to some embodiments of the present invention, there is provided a wireless device location unit operable within a system for controlling functionalities of at least one wireless device located within a defined volume. The wireless device location unit may include the following elements: a radio frequency "RF" receiver operative to scan and receive signals transmittable by the at least one wireless device located within the defined volume; a plurality of antennas connected to the RF receiver; and a processor connected to the RF receiver and operative to process received signals, wherein the at least one wireless device transmits signals on at least one communication channel, selected from a first number of communication channels, wherein the RF receiver is capable of simultaneously receiving a second number of communication channels which is smaller than the first number of communication channels, wherein the processor is configured to: divide a scanning time into time slots, wherein at each time slot, allocating the RF receiver to receive signals in a channel selected from the first number of communication channels, and allocating the processor to process signals received in an earlier time slot; assign a scanning priority to each of the first number of communication channels, wherein the wireless device location unit is further configured to scan, by the wireless device location unit, in accordance with the assigned scanning priority, at least one of said second number of communication channels, to detect and process RF signals transmitted by the at least one wireless device; wherein the processor is further configured to process, the received signals and assign an updated scanning priority to at least one of the first number of communication channels, wherein the assigned scanning priority is dynamically modifiable by the processor, and wherein the wireless device location unit is configured to repeat the scanning and the processing with the updated scanning priority.

According to some embodiments of the present invention, there is provided a non-transitory computer readable medium for allocating receiving and processing resources for scanning communication channels over a scanning time carried out by a wireless device location unit, operable within a system for controlling functionalities of at least one wireless device located within a defined volume, wherein said wireless device location unit comprises a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels; wherein the RF receiver is capable of simultaneously receiving a second number of communication channels which is smaller than the first number of communication channels, the computer readable medium comprising a set of instructions that when executed cause at least one processor to:

divide the scanning time into time slots, wherein at each time slot, allocating the RF receiver to receive signals in a channel selected from the first number of communication channels, and allocate the processor to process signals received in an earlier time slot;

assign a scanning priority to each of the first number of communication channels;

instruct the wireless device location unit to scan, in accordance with the assigned scanning priority, at least one of said second number of communication channels, to detect and process RF signals transmitted by the at least one wireless device;

process, the received signals and assign an updated scanning priority to at least one of the first number of communication channels, wherein the assigned scanning priority is dynamically modifiable; and repeat the scanning and the processing with the updated scanning priority.

These additional, and/or other aspects and/or advantages of the present invention are set forth in the detailed description which follows.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1A:
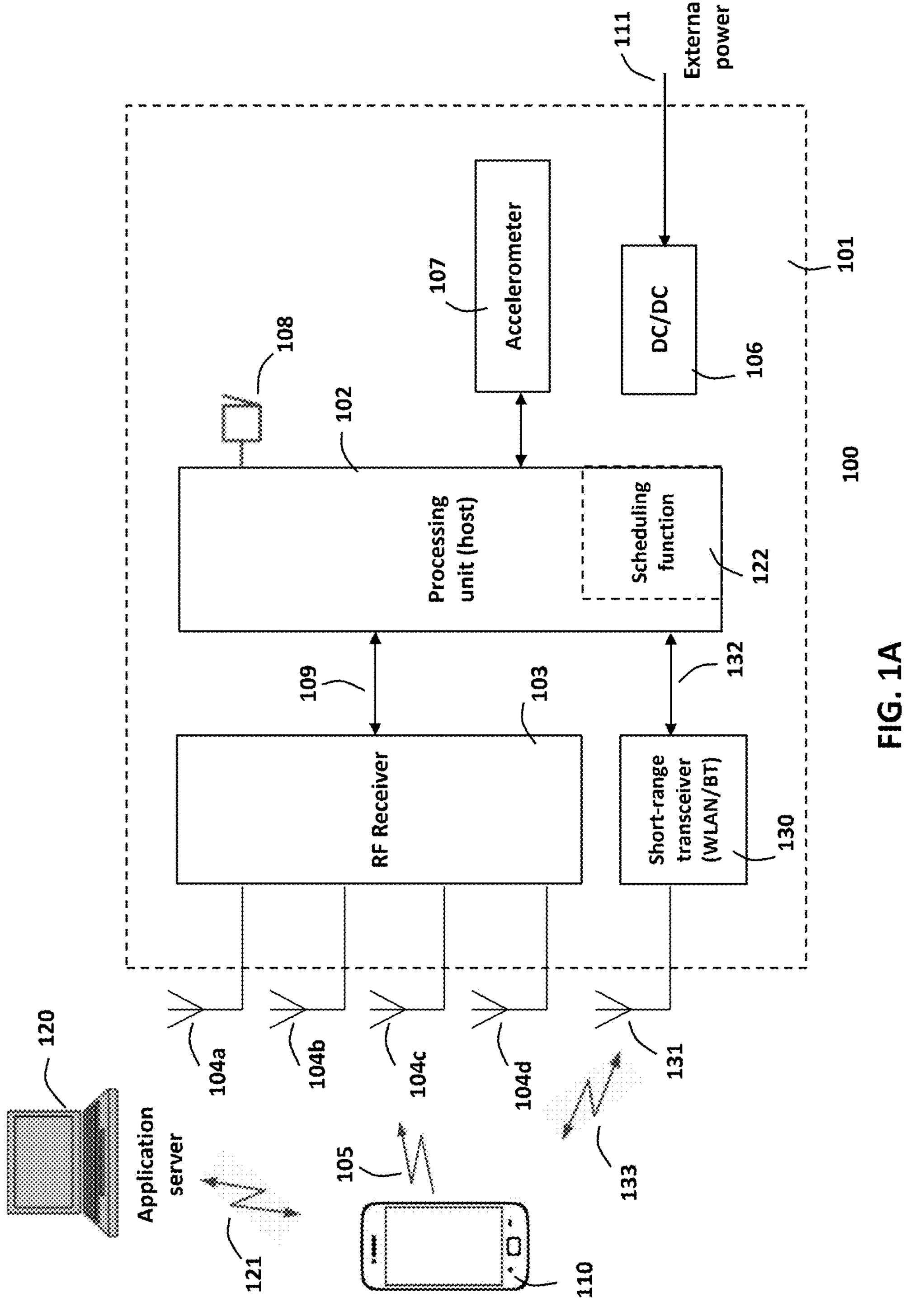
FIG. 1A: Shows an exemplary embodiment of a Wireless Device Location Unit comprising a single RF-receiver and processor suitable for the implementation of an exemplary embodiment of the present invention.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise.

It will be further understood that the terms "comprises" and/or "comprising" and/or "includes" and/or "including" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing embodiments of the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the invention.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Reference will now be made in detail to the present embodiments of the disclosure, certain examples of which are illustrated in the accompanying drawings.

According to some embodiments of the present invention, there is provided a method for allocating receiving and processing resources for scanning communication channels over a scanning time. The method carried out by a wireless device location unit, operable within a system for controlling functionalities (e.g., blocking, limiting, canceling, terminating, stalling, etc.) of a wireless device (e.g., mobile phone, smartphone, tablet, smart watch, etc.) inside a defined volume (e.g., vehicle, room, theater, etc.), wherein said wireless device location unit comprises a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels, and wherein the RF receiver is capable of simultaneously receiving a second number of communication channels which is smaller than the first number of communication channels. The method may include the following steps:

(a) dividing the scanning time into time slots, wherein at each time slot, allocating the RF receiver to receive signals in a channel selected from the first number of communication channels, and allocating the processor to process signals received in an earlier time slot;
(b) assigning a scanning priority to each of the first number of communication channels;
(c) scanning, by the wireless device location unit, in accordance with the assigned scanning priority, at least one of said second number of communication channels, to detect and process RF signals transmitted by the at least one wireless device;
(d) processing, by the processor, the received signals and assigning an updated scanning priority to at least one of the first number of communication channels, wherein the assigned scanning priority is dynamically modifiable by the processor; and
(e) repeating steps (c) and (d) with the updated scanning priority.

According to some embodiments of the present invention, there is provided a method for allocating receiving and processing resources for scanning communication channels over a scanning time. The method carried out by a wireless device location unit, operable within a system for controlling functionalities (e.g., blocking, limiting, canceling, terminating, stalling, etc.) of a wireless device (e.g., mobile phone, smartphone, tablet, smart watch, etc.) inside a defined volume (e.g., vehicle, room, theater, etc.), wherein said wireless device location unit comprises a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels, and wherein the RF receiver is capable of simultaneously receiving a second number of communication channels which is smaller than the first number of communication channels. The method may include the following steps:

(a) dividing the scanning time into time slots, wherein at each time slot, the RF receiver can be allocated to receive signals in a communication channel selected from the first number of communication channels, and the processor can be allocated to process signals received in an earlier time slot;
(b) assigning a scanning priority to each of the first number of communication channels;
(c) selecting at least one communication channel with the highest scanning priority;
(d) allocating the RF receiver to receive RF signals in the selected at least one communication channel;
(e) receiving RF signals in the selected at least one communication channel to detect and process RF signals transmitted by the at least one wireless device;
(f) allocating processing means to process the RF signals received in the selected at least one communication channel;
(g) processing, by the processor, the received signals and assigning an updated scanning priority to the selected at least one communication channel in accordance with the value of at least one parameter calculated by the processor and at least one time-related parameter, wherein the assigned scanning priority is dynamically modifiable by the processor; and;
(h) repeating steps (c) to (g) with the updated scanning priority.

According to some embodiments of the present invention, there is provided a wireless device location unit operable within a system for controlling functionalities of at least one wireless device located within a defined volume. The wireless device location unit may include the following elements: a radio frequency "RF" receiver operative to scan and receive signals transmittable by the at least one wireless device located within the defined volume; a plurality of antennas connected to the RF receiver; and a processor connected to the RF receiver and operative to process received signals, wherein the at least one wireless device transmits signals on at least one communication channel, selected from a first number of communication channels, wherein the RF receiver is capable of simultaneously receiving a second number of communication channels which is smaller than the first number of communication channels, wherein the processor is configured to: divide a scanning time into time slots, wherein at each time slot, allocating the RF receiver to receive signals in a channel selected from the first number of communication channels, and allocating the processor to process signals received in an earlier time slot; assign a scanning priority to each of the first number of communication channels, wherein the wireless device location unit is further configured to scan, by the wireless device location unit, in accordance with the assigned scanning priority, at least one of said second number of communication channels, to detect and process RF signals transmitted by the at least one wireless device; wherein the processor is further configured to process, the received signals and assign an updated scanning priority to at least one of the first number of communication channels, wherein the assigned scanning priority is dynamically modifiable by the processor, and wherein the wireless device location unit is configured to repeat the scanning and the processing with the updated scanning priority.

According to some embodiments of the present invention, the RF receiver may include at least one RF receiver chain operative to receive signals in a selected communication channel and wherein the number of said at least one RF receiver chains is smaller than the number of said plurality of antennas; and wherein said receiving is performed by connecting at least one of the plurality of antennas to at least one of the RF receiver chains.

According to some embodiments of the present invention, each of the communication channels is defined by at least one of: a frequency band and frequency channel used by the at least one wireless device, a center frequency and bandwidth of the RF signals, a receiving antenna, and the RF receiver chain used to receive the signals.

According to some embodiments of the present invention, the second number of communication channels may include a plurality of frequency channels and wherein the RF receiver is operative to simultaneously receive signals on no more than a subset of the frequency channels.

According to some embodiments of the present invention, the wireless device location unit is further connected to an application server, and wherein the first number of communication channels is updated by the application server in accordance with an expected activity of said communication channels.

According to some embodiments of the present invention, the wireless device location unit is further connected over a wireless link to at least one of the wireless devices and configured to send commands to the wireless device and wherein said commands comprise a request from the wireless device to transmit signals coordinated with said command.

According to some embodiments of the present invention, the wireless device location unit has information regarding a time window in which the wireless device transmits the coordinated signals following the request from the wireless device location unit and also may include information about one or more characteristics of at least one communication channel used by the wireless device to transmit the coordinated signals, and wherein the scanning priority assigned to said at least one communication channel during the time window is higher than the priority assigned to other communication channels.

According to some embodiments of the present invention, the wireless device location unit is further configured to locate the wireless device within the defined volume, and wherein the updated scanning priority assigned to the at least one communication channel is related to at least one of the communication channels associated with the wireless device that has been located.

According to some embodiments of the present invention, the RF receiver may include a plurality of RF receiver chains, each receiver chain operative to receive RF signals in a selected communication channel and wherein the wireless device location unit is operative to simultaneously scan a plurality of communication channels selected from the second number of the communication channels.

According to some embodiments of the present invention, the scanning by each of the RF receiver chains is performed independently from the scanning of the other RF receiver chains or in coordination therewith.

According to some embodiments of the present invention, at least one of the RF receiver chains is a wideband RF receiver chain configured to simultaneously receive a plurality of communication channels and wherein the scanning priorities of at least two of the communication channels are assigned based on the processing of the signals received by said wideband RF receiver chain.

According to some embodiments of the present invention, the reception by the wireless device location unit of the coordinated signals transmitted by the wireless device and said information is used by the wireless device location unit to identify said transmitted signals transmitted by said wireless device.

According to some embodiments of the present invention, there is provided a non-transitory computer readable medium for allocating receiving and processing resources for scanning communication channels over a scanning time carried out by a wireless device location unit, operable within a system for controlling functionalities of at least one wireless device located within a defined volume, wherein said wireless device location unit may include a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels; wherein the RF receiver is capable of simultaneously receiving a second number of communication channels which is smaller than the first number of communication channels, the computer readable medium comprising a set of instructions that when executed cause at least one processor to:

divide the scanning time into time slots, wherein at each time slot, allocating the RF receiver to receive signals in a channel selected from the first number of communication channels, and allocate the processor to process signals received in an earlier time slot;

assign a scanning priority to each of the first number of communication channels;

instruct the wireless device location unit to scan, in accordance with the assigned scanning priority, at least one of said second number of communication channels, to detect and process RF signals transmitted by the at least one wireless device;

process, the received signals and assign an updated scanning priority to at least one of the first number of communication channels, wherein the assigned scanning priority is dynamically modifiable; and repeat the scanning and the processing with the updated scanning priority.

As may be apparent to the skilled in the art, locating a wireless device in a volume (static or mobile) by a Wireless Device Location Unit may require processing the received RF signals transmitted by the wireless device. This processing may become more complex in the presence of multipath reflections generated by the volume (e.g., the cabin of a vehicle or walls of a room).

According to one embodiment of the present invention, the Wireless Device Location Unit may utilize one of the following methods or any combination of them, to locate the position of the wireless device in the volume and detect its presence in a predetermined area:

Received Signal Strength Indicator (RSSI): Using the RSSI at each antenna to estimate the wireless device distance to that antenna and then using triangulation techniques. This method may utilize the ratio of the RSSI at each antenna pair.

Channel fingerprinting: Generating a radio map of the volume comprising RF-parameters signatures at each of the antennas. Then estimating the wireless device position by correlating measured values of RF parameters at each antenna to fingerprints values in the radio map. Fingerprinting methods may utilize Power Level (RSSI) based methods, Delay-spread based methods, and other methods known in the art.

Time-Differential-Of-Arrival (TDOA): Estimating the position of the wireless device by multilateration of hyperbolae. For example, the Wireless Device Location Unit may comprise four antennas and two RF receivers, wherein the two RF receivers are selectively connected to a pair of antennas for a TDOA measurement.

Angle-Of-Arrival (AOA)/Direction-Of-Arrival (DOA) technology: Estimating the angle or direction of arrival at each of the antennas of wireless signals transmitted by the wireless device and then using this information to locate the wireless device.

Angle-Of-Arrival (AOA)/Direction-Of-Arrival (DOA) technology: Estimating the angle or direction of arrival by processing the signals simultaneously received by a plurality of spaced antennas and using this information to locate the wireless device.

According to one embodiment, the volume may be a vehicle (e.g., car, van, truck, bus, train, and the like), and the predetermined area inside the volume may be the area of the driver's seat inside the vehicle. The vehicle may sometimes be static and sometimes be moving with respect to the ground.

According to one embodiment, the volume may be a room (e.g., classroom, conference room, meeting room, theater, medical room, manufacturing area, and the like). People in the room holding wireless devices may sometimes be limited by certain rules related to the usage of wireless devices.

According to another embodiment, the wireless device may be a cellphone including smartphones and other portable devices comprising wireless communication means (e.g., tablets, laptops, pads, smartwatches, and the like).

According to one embodiment, the wireless device may further comprise an embedded application that may communicate with the Wireless Device Location Unit (e.g., through an embedded IEEE802.11a/b/g/n/ac/ad/ah/ax WLAN and/or BT/BLE transceiver). The application may enable the wireless device to transmit coordinated short-range RF signals (e.g., RF signals in accordance with Bluetooth, Bluetooth Low Energy, IEEE802.11a/b/g/n/ac/ad/ah/ax, IEEE802.15.4, and the like) when requested by the Wireless Device Location Unit. According to one embodiment, the transmission of the short-range signals by the wireless device is coordinated with the reception of at least part of those signals by the Wireless Device Location Unit.

According to one embodiment, the coordinated transmission of signals by the wireless device may be in accordance with commands provided to the wireless device by the Wireless Device Location Unit. According to one embodiment, those commands may comprise:

- Information related to the time window for the transmission of the RF signals.
- Characteristics of the transmitted RF signals (e.g., communication protocol, burst or message length, number of transmitted bursts, the interval between bursts, transmit power, the pattern of varying transmit power, data rate, data pattern, etc.).
- Communication channels that should be used by the wireless device to transmit the RF signals.

According to one embodiment, the coordinated transmission of signals by the wireless device may be part of bidirectional communication between the Wireless Device Location Unit and the wireless device (e.g., ping operation, RTC/CTS sequence, device connection, advertising beacon messages with a response, short-range data exchange, etc.).

In another embodiment, the embedded application may enable the wireless device (e.g., smartphone) to transmit cellular communication signals when requested by the Wireless Device Location Unit.

For example, the request from the Wireless Device Location Unit may comprise:

- Information related to the time window for the transmission of the RF signals.
- Characteristics of the transmitted RF signals (e.g., burst or message length, number of transmitted bursts, the interval between bursts, etc.).
- Communication channels that should be used by the wireless device to transmit the RF signals.

According to one embodiment, during the reception by the Wireless Device Location Unit of the coordinated signals transmitted by the wireless device, the WDLU may be programmed to search and detect one or more characteristics of the received signals. According to one embodiment, the additional information related to the transmitted signals (e.g., time window, RF characteristics, communication channels, etc.) is used by the Wireless Device Location Unit to identify the coordinated transmitted signals transmitted by the wireless device.

In one embodiment, the Wireless Device Location Unit may:

- Detect and/or identify additional characteristics of the coordinated RF signals (e.g., center frequency of communication channels, transmission power, signal bandwidth, channel timing, etc.)
- Identify other characteristics of the wireless device One example of such an application is the SaverOne's phone application part of the Everest project. The SaverOne application may be installed on cellphones of people who may travel in vehicles monitored by a Phone Location Unit (e.g., Everest system as provided by SaverOne).

According to one embodiment, the Wireless Device Location Unit ("WDLU") may include a single RF receiver (e.g., comprising an LNA, filters, a mixer, and IQ demodulator) which may receive signals transmitted on a single communication channel (from a plurality of communication channels).

According to one embodiment, the Wireless Device Location Unit may include a single RF receiver that may receive RF signals received by one of the antennas connected to the Wireless Device Location Unit.

As may be apparent to the skilled in the art, having a number of RF receivers (e.g., one) smaller than the number of communication channels to be scanned may impose processing of signals which were not simultaneously received. In some location systems, these constrain may generate difficulties to accurately locate the wireless device in the volume.

According to one embodiment, the Wireless Device Location Unit is installed in a defined volume and may periodically scan the available communication channels (e.g., communication channels using cellular frequency bands and other bands as IEEE802.11a/b/g/n/ac/ad/ah/ax, Bluetooth/BLE, etc.) to detect wireless device (e.g., cellphone) activity. The communication channels to be scanned may be pre-programmed and stored in the Wireless Device Location Unit memory. Typically, this may include the communication channels using the cellular bands operative in the country and/or zone where the defined volume (e.g., vehicle or room) is located.

According to one embodiment, the description of the communication channels to be scanned (e.g., the cellular bands, channel bandwidth, etc.) may be dynamically updated by an application server in accordance with the expected activity of said communication channels (e.g., the expected activity of the communication channels in a geographical area in which the volume is located, the expected activity of communication channels used by certain operators, etc.).

In such a system, the allocation of hardware (RF receiver means) and processing resources may require sophisticated scheduling in order to optimize the scanning process.

According to one embodiment, a scheduling function (also referred to as "scheduler") may be responsible to allocate the hardware (e.g., antenna, RF receiver, memory, A/D converter, buffers) resources and processing resources to the scanning process in order to optimize the probability of receiving signals from wireless devices operating in the defined volume. Those wireless devices may transmit simultaneously or at different times, on the same or different frequency channels.

According to one embodiment, the signals from the wireless devices may be received by all or part of the antennas connected to the WDLU. According to one embodiment, the wireless devices may use the same or different wireless technologies (e.g., cellular 3G/4G/5G, Wi-Fi, BT/BLE, etc.) and their transmissions may have different time domain and spectrum characteristics.

Different scheduling methods may be relevant to the allocation of WDLU resources (i.e., scanning of the communication channels, processing resources, memory allocation, and the like):

- Round-robin scheduling: According to this method, the scanning time is divided into time slices (also known as time quanta) and the scheduler allocates the hardware resources to scan each communication channel for a period equal to n slices. All channels are assigned equal scan times and in circular order. Round-robin scheduling is simple, easy to implement, and starvation-free.
- Fair-share scheduling is a scheduling method in which the WDLU resources are equally distributed among different wireless devices, as opposed to equal distribution among communication channels. Implementing this method is difficult, without a prior and full knowledge of the frequency band/center frequency to be used by each wireless device.
- Proportional fair is a compromise-based scheduling method based upon maintaining a balance between two competing interests: Trying to maximize the success probability of receiving any transmitted signal while at the same time allowing all wireless devices at least a minimal level of service.
- Priority scheduling is a method in which the WDLU hardware and processing resources are allocated according to a given priority which may be constant or variable.

According to one embodiment, the scheduling process may comprise the following steps:

(a) dividing the scanning time into time slices ("time slots"), wherein in each time slot, the receiver may be allocated to receive signals on a limited number of communication channels. According to one embodiment, the receiver may be allocated to receive signals on only a single communication channel. In another embodiment, the receiver may be allocated to simultaneously receive a plurality of communication channels that can be used by the wireless device for transmission.

According to one embodiment, the length of the time slots may be aligned to a specific wireless standard (e.g., 1 msec frames as used by the cellular LTE). According to one embodiment, the length of the time slot is defined according to the minimum time required to set up the hardware and collect the required number of signal samples (e.g., 512-2,048 samples). According to another embodiment, the length of the time slot takes also into account collecting signals in a specific frequency band, each time using a different antenna (e.g., 2-4 antennas) connected to the WDLU. According to one embodiment, the time slots preferably have a fixed length in order to simplify the scheduler operation. However, according to another embodiment, time slots with different lengths may also be used.

(b) assigning a priority to each communication channel A priority may be required to let the scheduler decide, as soon as it starts its operation, which communication channel shall be scanned first. According to one embodiment, an initial priority is given to each communication channel in accordance with one or the combination of: channel ID, the communication technology (e.g., 4G channels will have higher priority than 3G channels), probability of use of the channel in a certain area and/or at a certain time, statistical information previously collected, etc. According to one embodiment, the initial priority of each communication channel may be pre-stored in a WDLU memory or transferred to the WDLU from an external processor, server, etc.

(c) selecting at least one communication channel with the highest priority. According to one embodiment, each communication channel has at any given time, a scanning priority. According to one embodiment, this scanning priority is represented by a number composed from a plurality of fields, wherein the value of the scanning priority is a number calculated from the sum of the values represented by the different fields wherein each value is multiplied by a factor relative to its respective position in the scanning priority parameter. According to one embodiment, each field may be weighted differently thus achieving a different influence of each field on the calculated priority. For example, in a certain embodiment of the present invention the fields may be:

- The status of the communication channel: enabled or disabled
- Initial communication channel priority
- The antenna number to be used
- A minimum number of continuous-time slots required to scan the communication channel
- A flag denoting that signals are currently present or absent in the communication channel In one embodiment, this flag may also denote the number of antennas that received signals in that communication channel
- A flag denoting that a phone was recently located in that communication channel
- A field denoting the time elapsed since the last time slot in which this channel was scanned to the current time slot.
- A field denoting the communication technology (e.g., 2G, 3G, LTE, 5G) used in that frequency band.
- A field forcing a high priority when certain processing conditions require that (e.g., alignment of the reception timing to an expected wireless device transmission).
- The number of wireless signals samples that shall be collected and processed to estimate the location of a wireless device in the volume (e.g., interior of a ground vehicle or room).
- A custom priority assigned to one or more communication channels
- A field with a stochastic value (e.g., used to avoid repetitive scanning patterns)

For example, if after scanning a certain communication channel and processing the samples, a signal is detected, the priority of that communication channel may be increased to let the scheduler continue scanning this channel and/or scan this channel more frequently. According to one embodiment, if a signal is detected in a certain communication channel, the scheduler may continue scanning this channel for a pre-programmed number of time slots in order to allow a reliable location of the wireless device in the volume.

Alternatively, if a communication channel was not scanned for a long time (e.g., few hundreds of msec or seconds), an elapsed-time field may increase the priority of that channel and force the scheduler to allocate resources and scan this channel.

According to one embodiment, some or all the fields composing the scanning priority may be changed asynchronously by different WDLU functions (e.g., scheduler, processing algorithms, WDLU controller, etc.). The scheduler may decide at the beginning of each time slot which communication channel has the highest priority (regardless of how this priority was achieved) and then may allocate resources to scan this channel and process the received signals. This mechanism may significantly simplify the scheduling process.

According to one embodiment, the WDLU may include hardware means to simultaneously scan more than one communication channel (i.e., a plurality of receive chains, etc.). In that case, the hardware (e.g., an available RF receiver) is allocated to scan a communication channel that has the highest priority at the moment the hardware is available to scan a new communication channel.

(d) controlling in each time slot, the RF receiver to receive signals from the selected at least one communication channel. In this step, the scheduler may allocate resources to scan the selected communication channel (s). According to one embodiment, this step may comprise: selecting an antenna, selecting an RF receiver, selecting a bandpass filter, programming the gain of the RF receiver, programming a synthesizer, programming a demodulator, programming a sampling clock, allocating memory to store the signal samples, programming the number of samples to be sampled, allocating buffers to store the processed signals, etc. According to one embodiment, a short collection of signal samples (e.g., 64 samples) may precede the full collection of samples to allow the estimation of the signal strength and based on that, properly program the receiver gain for the full collection (e.g., thus avoiding overflow in the A/D converter).

(e) receiving signals in the selected at least one communication channel. In this step, the WDLU samples the incoming signals in the selected communication channel(s). According to one embodiment, the received RF signals are split into I&Q signals and then sampled separately. According to one embodiment, the samples are stored in a memory in the WDLU for further processing.

(f) allocating processor to process the signals received from the selected at least one communication channel and processing the received signals. In this step, the signal samples are processed to detect the presence of signals transmitted by wireless devices in the volume, calculate different parameters, and then locate the wireless device in the volume. According to one embodiment, processing the samples may take one or more time slots. In some cases, the samples may contain only noise or random signals which do not require any additional processing while in other cases, the samples may comprise signals transmitted by a wireless device (e.g., a cellphone) located inside the volume. According to one embodiment, the scheduler takes into account the required processing time to start scanning a new communication channel According to another embodiment, as soon as the processing of signals received at time slot N starts, the scheduler continues, at time slot N+1, scanning the same or other communication channels (i.e., concurrently with the processing of time slot N).

(g) reassigning an updated scanning priority to the selected at least one communication channel in accordance with the value of at least one parameter that was estimated by the processor and at least one time-related parameter. According to one embodiment, this step may define the effectiveness of the scheduling process. Once the samples have been processed and different parameters related to the sampled signal were estimated, a new priority is reassigned to the scanned communication channel.

As previously described, and according to one embodiment, at least two types of parameters may be used to calculate the new scanning priority:

A parameter that was estimated as part of the signal processing. For example, presence/absence of a signal in the selected communication channel, the RSSI of the detected signal, the probability that the received signal was transmitted by a wireless device in a specific area (e.g., the driver's seat in a vehicle), the number of antennas in which this signal was recently detected, an indication whether the detected signal belongs to a wireless device already located, or whether the detected signal belongs to a wireless device already located in a specific area (e.g., the driver's seat in a vehicle), the quality of the detected signal, etc.

A time-related parameter. For example, the minimum number of time slots to scan the channel if a signal is present or absent, the value of a counter counting the number of time slots since the scheduler started scanning this communication channel, an external event which forces the scanning time to be extended (e.g., information that a wireless device will start transmitting shortly), alignment of the scanning time slot to specific cellular frames (e.g., 10 msec frames as used by LTE), the total amount of signal samples collections required to estimate the location of the wireless device (e.g., mobile phone, cellphone, tablet, etc.) in the volume (e.g., interior of a vehicle), etc.

According to one embodiment, the scheduler may also update the priority of a communication channel based on external events, processing unit requests, etc.

According to one embodiment, the scheduler may also reassign an updated priority to other communication channels as well, based on at least a time-related parameter. For example, based on the elapsed time between the last time slot in which a channel was scanned and the current time slot. According to one embodiment, the elapsed time may be weighted differently for different types of communication channels. This way, the scheduler may scan some communication channels more frequently than others. According to one embodiment, the used weights may be pre-programmed or dynamically changed by processing elements in the WDLU.

According to one embodiment the update of the scanning priority may be learning-based, for example:

Based on the previous history (i.e., transmission characteristics) of the communication channel Based on the statistical quality of the received signals of a communication channel (i.e., the scheduler may need to allocate less or more resources to locate wireless devices operating in this communication channel).

Based on the motion characteristics of the wireless device inside the volume.

According to one embodiment, the process described above (steps c to g) may continue indefinitely or until the WDLU is disabled or powered-off. The scanning priorities of the communication channels may be continuously updated in accordance with the signal detection and wireless device location processes. The scheduler may allocate the resources to scan the communication channel(s) which at any given time, have the highest priority.

According to one embodiment, some of the fields composing the scanning priority value are subject to an aging mechanism that may avoid starvation of the scheduling process. For example, the signal detected flag will age after a predetermined number of time slots if no signal was detected again in that communication channel That way, the high priority that a communication channel had when a signal was detected may be decreased to a lower priority after the signal-detect flag aged. A similar mechanism may be used with other parameters as well (e.g., aging of a flag denoting that a wireless device was located).

According to one embodiment, scanning times may be also aligned to external events. For example, the scheduler may be requested by the processing unit (host) to scan during a specified time period, only a determined set of communication channels (e.g., comprising the frequency bands of a specific cellular operator or the cellular bands used by a cellular phone in a specific area), in some cases following a notification (e.g., through a short-range communication channel) from a wireless device (e.g., a cellphone working with that cellular operator) that it will start soon transmitting signals. In another embodiment, the scheduler may be requested by the processing unit (host) to increase, during a specified time period, the scanning priority of a determined set of communication channels (e.g., comprising the bands of a specific cellular operator) in relation to other communication channels.

According to one embodiment, the Wireless Device Location Unit may be further connected to an application server, and wherein the communication channels to be scanned may be updated by the application server in accordance with the expected activity in said communication channels.

According to one embodiment, the Wireless Device Location Unit may have information regarding the time window in which the wireless device may transmit signals following the request of the Wireless Device Location Unit and information on the characteristics of at least one communication channel that may be used by the wireless device, and based on that the scanning priority assigned to that at least one communication channel during the time window may be higher than the priority assigned to other communication channels.

According to one embodiment, the receiver may include a plurality of RF receiver chains, each receiver chain operative to receive signals in a selected communication channel and wherein the Wireless Device Location Unit is operative to simultaneously scan a plurality of communication channels For example, a Wireless Device Location Unit comprising a plurality of receiver chains (e.g., 2-4 RF receiver chains) may operate in different operating modes as follows:

- Each RF receiver chain is connected to a separate antenna, wherein all the receiver chains are programmed to receive signals in the same frequency channel and/or same frequency band.
- Each RF receiver chain is connected to a separate antenna, wherein some of the receivers are programmed to receive signals in different but adjacent frequency channels in the same frequency band.
- Each RF receiver chain is connected to a separate antenna, wherein the RF receivers are programmed to receive signals from different frequency channels and/or different frequency bands.
- Two or more RF receiver chains may share a single antenna.
- The RF receiver chains may operate independently or time-synchronized (e.g., common sampling clock).
- The RF receiver chains may operate independently or coordinated.
- The RF receiver chains may be managed by a single scheduler managing the scanning priority of all the RF receiver chains.
- The RF receiver chains are managed by a plurality of schedulers, independently operating.
- The RF receiver chains change dynamically their operating mode in accordance with events detected in the Wireless Device Location Unit.
- The operating mode of the RF receiver chains is managed by a processing unit (host) in the Wireless Device Location Unit.

According to one embodiment, a Wireless Device Location Unit comprising a plurality of RF receiver chains may include at least one wideband RF receiver chain, said wideband (e.g., 1-3 GHz) RF receiver chain able to receive simultaneously a large number of communication channels and wherein the scanning priorities of at least two communication channels are assigned based on the processing of the signals received by said wideband RF receiver chain.

For example, a feedback chain may be used as an observation path to monitor a frequency band with a very large bandwidth and based on the presence/absence of signals in that frequency band, the scheduler will assign scanning priorities to different communication channels. The assignment of priorities may be combined with other methods already described.

According to one embodiment, the scheduler may be programmed to scan differently those communication channels related to wireless devices (e.g., cellphones) located in a predetermined area within a volume. In one embodiment the volume may be one of a meeting room, conference room, classroom, auditorium, theater, medical room, and the like.

According to one embodiment, the Wireless Device Location Unit may be informed about the occurrence of an event in the volume and wherein scanning the communication channels is performed and/or adapted to the occurring event.

According to one embodiment, the Wireless Device Location Unit may be informed about certain conditions related to the volume (e.g., room darkness, level of sound and/or noise in the room, vehicle's accident, etc.) and wherein scanning the communication channels is performed and/or adapted to the certain conditions in the volume.

According to one embodiment, the whole frequency spectrum in which wireless devices may transmit may be divided into frequency bands (e.g., 5-100 MHz bandwidth). Each frequency band may be sub-divided into sub-bands (e.g., 5-30 MHz) in accordance with the hardware capabilities of the WDLU and/or other parameters (e.g., allocation of sub-bands by the operator, communication standards, etc.). Each frequency sub-band may be further sub-divided into frequency channels (i.e., the frequency is the carrier frequency) used by the wireless devices to transmit/receive data. In some cases, wireless devices may use several frequency channels to increase the data rate. According to an embodiment, communication channels as referred to in this document make use of one or more frequency channels in one or more frequency sub-bands.

According to an embodiment, the priority parameter may be assigned to communication channels, frequency bands, frequency sub-bands, and channels. Some of the examples are described for frequency bands but the same principles may also be applied to communication channels, frequency sub-bands, and channels as well.

FIG. 1*a* is a diagram illustrating an exemplary system 100 that may be used to implement certain aspects of the disclosed embodiments. The type, number, and arrangement of devices, components, and elements that are illustrated in FIG. 1A may vary consistent with the disclosed embodiments.

In one embodiment, system 100 may comprise one Wireless Device Location Unit 101 installed in a defined volume and at least one wireless device 110. The Wireless Device Location Unit 101 may comprise a processing unit 102 which may control the Wireless Device Location Unit 101, at least one RF receiver 103 coupled 109 to the processing unit 102 and coupled to a plurality of antennas 104*a*-104*d*, an accelerometer 107, a buzzer 108, and a DC/DC converter 106 that may provide the required power to each of the Wireless Device Location Unit 101 functions. The coupling 109 between the at least one RF receiver 103 and processing unit 102 may consist of a digital data bus, comprising sampled data from an Analog-to-Digital component (not shown) in the receiver 103. The A/D samples may be processed by the processing unit 102 to detect and locate the source of the received signals 105.

In one embodiment, the Analog-to-Digital (A/D) component is part of the RF receiver unit 103 wherein analog signals are provided by the RF receiver 103 through the coupling 109. In one embodiment each coupling 109 may use a plurality of lanes (e.g., 2 lanes) in order to reduce the data rate at every single lane.

The DC/DC converter may also be connected 111 to an external power source. According to one embodiment, the external power source is a vehicle's battery.

In one embodiment, a wireless device 110 within the volume (e.g., vehicle's cabin) in which the antennas 104*a*-104*d* are deployed and operative to receive wireless signals 105 transmitted by the wireless device 110, may be located in a predetermined area (e.g., driver's seat area) inside the volume.

According to one embodiment, the antennas 104*a*-104*d* may be installed in different places in the volume in order to create space diversity to the wireless signals 105 transmitted within the volume. The places in which those antennas 104*a*-104*d* are installed may have a significant influence on the system performance and to its ability to locate a wireless device 110 in a predetermined area (e.g., driver's seat area or passenger's area). According to one embodiment, the placement of the antennas 104-104*d* may be optimized to locate wireless devices 110 in the driver's seat area.

In one embodiment, the Wireless Device Location Unit 101 may scan the communication channels which the wireless device 110 may use to transmit messages 105. Those communication channels may comprise the frequency bands used by the cellular service providers (e.g., GSM, 3GPP, W-CDMA, EDGE, GPRS, LTE, CDMA2000, WiMAX, 5G, and others) or in wireless local networks (e.g., IEEE802.11a/b/g/n/ac/ad/ah/ax WLAN, Bluetooth/BLE, etc.).

According to one embodiment, the processing unit 102 scans the communication channels in accordance with a scanning priority assigned to each communication channel at any given time.

According to one embodiment, the scanning of the communication channels may be performed by a scheduling function 122. According to one embodiment, the scheduling function 122 may be a SW function performed by the processing unit (host) 102. In another embodiment, the scheduling function 122 may comprise special hardware elements (e.g., to mark timing, to perform switching, to allocate resources, etc.), special FW elements, and/or any combination thereof.

In one embodiment, the scheduling function 122 may comprise a special processor interfaced (not shown) with the processing unit 102.

According to one embodiment, the scheduling process performed by the scheduling function 122 may comprise the following steps:

(a) dividing the scanning time into time slices ("time slots"), wherein at each time slot the receiver can be allocated to receive signals on a limited number of communication channels;

(b) assigning a priority to each communication channel;

(c) scanning at least part of the plurality of communication channels in accordance with a scanning priority assigned to each communication channel, wherein the assigned scanning priority is dynamically modified by the processor 102 and is different from the assigned initial priority.

According to one embodiment, each communication channel has at any given time, a scanning priority. According to one embodiment, this scanning priority is represented by a number composed from a plurality of fields, wherein the value of the scanning priority is the number calculated from the sum of the values represented by the different fields wherein each value is multiplied by a factor relative to its respective position in the scanning priority parameter. According to one embodiment, each field may be weighted differently thus achieving a different influence of each field on the calculated priority. For example, in a certain embodiment of the present inventions the fields may be:

- The status of the communication channel: enabled or disabled
- Initial communication channel priority
- The antenna number to be used
- A minimum number of continuous-time slots that are required to scan the communication channel
- A flag denoting if signals are currently present or absent in the communication channel In one embodiment, this flag also denotes the number of antennas that received signals in that communication channel
- A flag denoting if a phone was recently located in that communication channel
- A field denoting the time elapsed since the last time slot in which this channel was scanned to the current time slot.
- A field denoting the communication technology (e.g., 3G, LTE, 5G, Wi-Fi) used in the corresponding frequency band.
- A field providing different scanning priority to frequency bands in which transmissions from a wireless device comprising a special application were received.
- A field denoting the probability that the signals transmitted 105 in that frequency band are transmitted from a wireless device 110 located in a predetermined area (e.g., driver's seat in a vehicle). According to one embodiment, this probability is calculated based on the RSSI of the signals at each antenna 104*a*-104*d*.
- A field forcing a high priority when certain processing conditions require that (e.g., alignment of the reception timing to an expected wireless device transmission).
- The number of wireless signals 105 samples that shall be collected and processed to estimate the location of a wireless device in the volume.
- A custom priority assigned to one or more communication channels
- A field with a stochastic value (e.g., used to avoid repetitive scanning patterns)

(d) controlling in each time slot, the RF receiver to receive signals from the selected at least one communication channel.

(e) receiving signals in the selected at least one communication channel.

(f) allocating processor to process the signal 105 samples collected from the selected at least one communication channel and processing them.

(g) reassigning an updated priority to the selected at least one communication channel in accordance with the value of at least one parameter that was estimated by the processor and at least one time-related parameter.

According to one embodiment, the update of the scanning priority is learning-based. According to one embodiment, the Wireless Device Location Unit 101 may further comprise an embedded short-range wireless link (e.g., an IEEE802.11a/b/g/n/ac/ad/ah/ax WLAN and/or BT/BLE transceiver) 130. The short-range transceiver 130 may comprise an antenna (internal or external) 131 and may be connected 132 to the processing unit 102. In one embodiment, the short-range transceiver 130 may communicate 133 with a wireless device 110 in communication range. According to one embodiment, the short-range communication 133 may be performed through an IEEE802.11a/b/g/n/ac/ad/ah/ax Access Point, hub, gateway, or the like (not shown).

According to one embodiment, the Wireless Device Location Unit 101 may communicate 133 with a wireless device 110 and request from it to transmit wireless signals 105 (e.g., cellular communication signals) in accordance with commands provided to the wireless device 110 by the Wireless Device Location Unit 101. According to one embodiment, the transmission of the signals 105 by the wireless device 110 is coordinated with the reception by antennas 104*a*-104*d* of at least part of those signals 105 by the Wireless Device Location Unit 101.

According to one embodiment, those commands may comprise:

Information related to the time window for the transmission of the RF signals.

Characteristics of the transmitted RF signals (e.g., communication protocol, burst or message length, number of transmitted bursts, the interval between bursts, transmit power, the pattern of varying transmit power, data rate, data pattern, etc.).

Communication channels that should be used by the wireless device to transmit the RF signals.

According to one embodiment, the coordinated transmission of signals by the wireless device may be part of a bidirectional communication 133 between the Wireless Device Location Unit 101 and the wireless device 110 (e.g., ping operation, RTC/CTS sequence, device connection, advertising beacon messages with a response, short-range data exchange, etc.). In such a case, the short-range wireless signals 133 transmitted by the wireless device 110 may be simultaneously received by RF receiver antennas 104*a*-104*d* and the short-range transceiver antenna 132.

According to one embodiment, the signals 133 received by the short-range transceiver 130 may be decoded and used to identify the source of the transmitted signals (i.e., the ID of the wireless device 110). The reception and decoding of signals 133 by the short-range transceiver 130 may be used to coordinate and set a time-window of the RF receiver 103 to receive the same signals 133 (i.e., also referred to as 105 in this case).

In one embodiment, the Wireless Device Location Unit 101 has information regarding the time window in which the wireless device 110 may transmit signals following a request from the Wireless Device Location Unit and information on the characteristics of at least one communication channel that may be used by the wireless device. According to one embodiment, the scanning priority assigned to at least one communication channel during the time window may be higher than the priority assigned to other communication channels.

According to one embodiment, during the reception by the Wireless Device Location Unit 101 of the coordinated signals 105 transmitted by the wireless device 110, the WDLU may search for one or more characteristics in the received signals. According to one embodiment, the additional information related to the transmitted signals (e.g., time window, RF characteristics, communication channels, etc.) is used by the Wireless Device Location Unit 101 to identify the coordinated transmitted signals transmitted by the wireless device 110.

In one embodiment, the Wireless Device Location 101 Unit may:

Detect and/or identify additional characteristics of the coordinated RF signals (e.g., center frequency of communication channels, transmission power, signal bandwidth, channel timing, etc.)

Identify other characteristics of the wireless device

In one embodiment, the at least one RF receiver 103 may be programmed to receive signals in the frequency band of the wireless signals 105 transmitted by the wireless device 110. According to one embodiment, the RF receiver 103 may be connected one at a time to each of the antennas 104*a*-104*d*. This connection may be performed by an RF switch (not shown), typically with a low insertion loss and low noise figure. The architecture of the RF receiver 103 may differ among different implementations of the Wireless Device Location Unit 101. In one embodiment, it may comprise a low noise amplifier (LNA), bandpass filters, a synthesizer, a mixer, an IQ demodulator, low pass filters, and analog-to-digital converters. The sampled baseband signals may be transferred 109 to a processing unit 102 to be further processed.

According to one embodiment, wireless signals 105 transmitted by the wireless device 110 are captured by the antennas 104*a*-104*d* and fed (e.g., at different times) to the RF receiver 103 which may convert the RF signals to digital baseband (I&Q) signals. Further according to this embodiment, the processing unit 102 may store the samples in a RAM (not shown). The sampling rate and the number of samples collected from each antenna 104*a*-104*d* may be programmable. In one embodiment, the processing unit may sample the I&Q signals at a rate of 38.4 MHz or 61.44 MHz and collect 2,048 samples from each antenna 104*a*-104*d*.

As may be apparent to the skilled in the art, the architecture of the RF receiver 103 may vary. For example, in a certain embodiment of the present inventions the RF receiver 103 may consist of:

A single conversion (zero-IF) receiver with an IQ demodulator

A wideband receiver in which the RF signal is directly sampled by a fast analog to digital converter "ADC" (e.g., sample rate=3 Gsps).

A receiver with a programmable sampling rate

A receiver with a programmable gain

A receiver with a programmable bandwidth

The processing unit 102 may the collection process until enough signal samples from each of the antennas 104*a*-104*d* are collected in order to estimate the location of the wireless device 110 in the volume.

As may be apparent to the skilled in the art, the processing unit 102 may comprise a Digital Signal Processor (DSP), RAM, Flash memory, I/O ports, clocks, and other functions required to perform the processing of the sampled signals.

According to certain embodiments of the invention, machine-readable memory containing or otherwise storing a program of instructions which, when executed by the processor, implements some or all of the Wireless Device Location Unit 101, methods, features, and functionalities of the invention shown and described herein.

According to one embodiment of the present invention, the Wireless Device Location Unit 101 may utilize one of the following methods or any combination of them, to locate the position of the wireless device 110 in the volume and detect its presence in a predetermined area:

- Received Signal Strength Indicator (RSSI): Using the RSSI at each antenna to estimate the wireless device distance to that antenna and then using triangulation techniques. This method may utilize the ratio of the RSSI at each antenna pair 104*a*-104*d*.
- Channel fingerprinting: Generating a radio map of the volume comprising RF-parameters signatures at each of the antennas. Then estimating the wireless device position by correlating measured values of RF parameters at each antenna to fingerprints values in the radio map. Fingerprinting methods may utilize Power Level (RSSI) based methods and Delay-spread based methods.
- Time-Differential-Of-Arrival (TDOA): Estimating the position of the wireless device by multilateration of hyperbolae. For example, the Wireless Device Location Unit may comprise four antennas and two RF receivers, wherein the two RF receivers are selectively connected to a pair of antennas for a TDOA measurement.
- Angle-Of-Arrival (AOA)/Direction-Of-Arrival (DOA) technology: Estimating the angle or direction of arrival at each of the antennas of wireless signals transmitted by the wireless device and then using this information to locate the wireless device.

According to one embodiment of the present invention the method for computing the estimated location of the wireless device 110 by the processing unit 102, is learning-based.

According to one embodiment, the processing unit 102 may use the estimated location of the wireless device 110 to detect wherein the wireless device 110 is located inside a predetermined area (e.g., driver's seat). Further according to this embodiment, the processing unit may notify a person inside the volume (e.g., the driver of the vehicle) if the wireless device 110 is in the predetermined area and transmitting signals 105. In one embodiment, such notification may be provided by the Wireless Device Location Unit 101 when the vehicle (and the wireless device in it) is moving above a certain speed with respect to the ground.

According to one embodiment, the wireless device 110 may further comprise an application that may communicate with the Wireless Device Location Unit 101 through a short-range transceiver (e.g., IEEE802.11a/b/g/n/ac/ad/ah/ax WLAN and/or BT/BLE) 130. The application may enable the wireless device to transmit signals 105 when requested by the Wireless Device Location Unit 101.

According to one embodiment, the application in the wireless device 110 is also operative to exchange information 121 with a remote server 120. Further according to this embodiment, the wireless device 110 and remote server 120 may exchange several types of information as follows (partial list):

- List of the frequency bands/channels to scan, optionally including an initial scanning priority.
- List of specified functionalities and applications which may be blocked when the wireless device 110 is moving above a certain speed and transmitting from a predetermined area in a volume.
- The Wireless Device Location Unit 100 operating parameters.
- The Wireless Device Location Unit 100 firmware, optionally comprising updated scheduling algorithms.

Figure 1B:
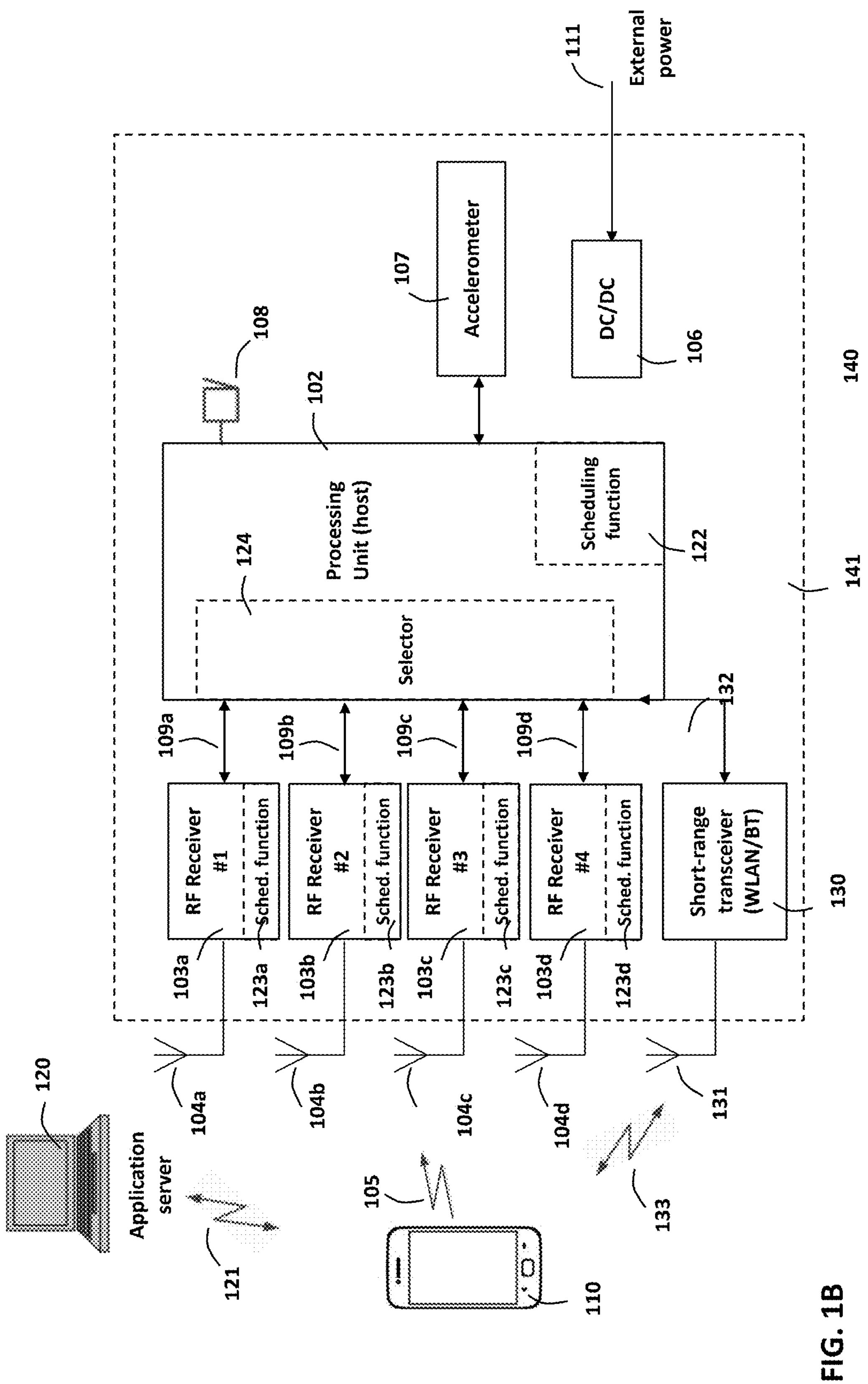
FIG. 1B: Shows an exemplary embodiment of a Wireless Device Location Unit comprising a plurality of RF receivers and a processor suitable for the implementation of an exemplary embodiment of the present invention.

Referring now to FIG. 1B, a diagram illustrating an exemplary system 140 that may be used to implement certain aspects of the disclosed embodiments is depicted. The type, number, and arrangement of devices, components, and elements that are illustrated in FIG. 1B may vary consistent with the disclosed embodiments. For the sake of simplicity, functions already described with respect to FIG. 1A will not be described again.

In one embodiment, system 140 may comprise one Wireless Device Location Unit 141 installed in a volume and at least one wireless device 110. The Wireless Device Location Unit 141 may comprise a processing unit 102 which may control the Wireless Device Location Unit 141, a plurality of RF receivers #1-#4 103*a*-103*d* respectively coupled 109*a*-109*d* to the processing unit 102 and coupled to a plurality of antennas 104*a*-104*d*, an accelerometer 107, a buzzer 108 and a DC/DC converter 106 that may provide the required power to each of the Wireless Device Location Unit 141 functions. The coupling 109*a*-109*d* between the plurality of RF receivers #1-#4 103*a*-103*d* and processing unit 102 may consist of at least one digital data bus, comprising sampled data from an Analog-to-Digital component (not shown) in the receivers 103*a*-103*d*. The A/D samples may be processed by the processing unit 102 to detect and locate the source of the received signals 105.

In one embodiment, the couplings 109*a*-109*d* may comprise a parallel data bus (e.g., 16 or 32 bits) or a serial data bus (e.g., in accordance with JESD204B or JESD204C SerDes interface). In one embodiment each coupling 109*a*-109*d* may use a plurality of lanes (e.g., 2-4 lanes) to reduce the data rate at every single lane.

According to one embodiment, the Wireless Device Location Unit 141 may comprise a selecting function ("selector") 124 which may be used to select one or more couplings 109*a*-109*d* and interface the RF Receivers #1-#4 103*a*-103*d* with other functions (e.g., memories, direct memory access "DMA" channels, serial to parallel converters, buffers, A/D converters, etc.) in the processing unit 102. In one embodiment, the selecting function 124 may be a SW function executed by the processing unit 102. In another embodiment, the selecting function may comprise special hardware functions (analog and/or digital), processing functions that may also operate in combination with the processing unit 102.

In one embodiment, the selecting function 124 may select only one coupling 109*a*-109*d* while in another embodiment, comprising more processing resources, the selecting function 124 may select a plurality of couplings 109*a*-109*d*.

As may be apparent to the skilled in the art, the selecting function 124 may be implemented in many ways.

According to one embodiment, a plurality of Analog-to-Digital (A/D) components (not shown) is part of the processing unit 102 wherein analog signals are provided by the plurality of RF receivers #1-#4 103*a*-103*d* through the coupling 109*a*-109*d*. In one embodiment, the analog signals are I&Q (In-phase and quadrature) signals, each preferably implemented as a pair of differential signals in order to reduce the common-mode noise and improve the signal to noise ratio "SNR".

According to one embodiment, each RF receiver 103*a*-103*d* is operative to receive signals 105 in a selected communication channel and wherein the signal reception is performed by connecting at least one antenna 104*a*-104*d* to each RF receiver 103*a*-103*d*; and wherein the Wireless Device Location Unit 141 is operative to simultaneously scan at least part of the plurality of communication channels with the plurality of RF receivers #1-#4 103*a*-103*d*.

For example, a Wireless Device Location Unit 141 comprising a plurality of receivers 103*a*-103*d* may operate in different operating modes as follows:

- Each receiver 103*a*-103*d* is connected to a separate antenna 104*a*-104*d*, wherein all the receivers 103*a*-103*d* are programmed to receive signals from the same frequency channel
- Each receiver 103*a*-103*d* is connected to a separate antenna 104*a*-104*d*, wherein some of the receivers 103*a*-103*d* are programmed to receive signals from different but adjacent frequency channels.
- Each RF receiver #1-#4 103*a*-103*d* is connected to a separate antenna 104*a*-104*d*, wherein the receivers 103*a*-103*d* are programmed to receive signals from different frequency channels.
- Two or more RF receivers #1-#4 103*a*-103*d* may share a single antenna 104*a*-104*d*.
- The RF receivers #1-#4 103*a*-103*d* may operate independently or time-synchronized (e.g., common sampling clock).
- The RF receivers #1-#4 103*a*-103*d* may operate independently or coordinated.
- The RF receivers #1-#4 103*a*-103*d* may be managed by a single scheduling function 122 managing the scanning priority of all the RF receivers #1-#4 103*a*-103*d*.
- The RF receivers #1-#4 103*a*-103*d* are managed by a plurality of scheduling functions 123*a*-123*d*, independently operating each other.
- The RF receivers #1-#4 103*a*-103*d* change dynamically their operating mode in accordance with events detected in the Wireless Device Location Unit 141.
- The operating mode of the RF receivers #1-#4 103*a*-103*d* is managed by a processing unit 102 in the Wireless Device Location Unit 141.

According to one embodiment, the scheduling process by the processing unit 102 may comprise the following steps:

(a) dividing the scanning time into time slices ("time slots"), wherein at each time slot the receiver can be allocated to receive signals on a limited number of communication channels;

(b) assigning an initial priority to each communication channel;

(c) scanning at least part of the plurality of communication channels in accordance with a scanning priority assigned to each communication channel, wherein the assigned scanning priority is dynamically modified by the processor 102 and is different from the assigned initial priority.

(d) based on the availability of RF receivers #1-#4 (i.e., RF receivers #1-#4 which are not busy performing a signal collection), controlling in each time slot, at least one RF receiver to receive signals from the selected at least one communication channel.

(e) receiving signals in the selected at least one communication channel by the selected RF receiver.

(f) allocating processor to process the signal samples collected from the selected at least one communication channel and processing them.

(g) reassigning an updated priority to the selected at least one communication channel in accordance with the value of at least one parameter that was estimated by the processor and at least one time-related parameter.

According to one embodiment, the scanning of the communication channels may be performed by a scheduling function 122. According to one embodiment, the scheduling function 122 may be a software "SW" function performed by the processing unit (host) 102. In another embodiment, the scheduling function 122 may comprise special hardware elements (e.g., to mark timing, to perform switching, to allocate resources, etc.), special firmware "FW" elements, and/or any combination thereof.

In one embodiment, the scheduling function 122 may comprise a special processor interfaced (not shown) with the processing unit 102.

According to one embodiment, some or all of the RF receivers 103*a*-103*d* may comprise a scheduling function 123*a*-123*d* to schedule the scanning activities of the corresponding receiver 103*a*-103*d*. In one embodiment, the scheduling functions 123*a*-123*d* are integrated into the processing unit 102.

As may be apparent to the skilled in the art, the scheduling function 122, may optimize the communication channel scanning by programming the RF receivers #1-#4 103*a*-103*d* to operate in different modes. For example, some receivers may perform short signal collections (i.e., few time slots) while others may perform long collections.

In one embodiment the Wireless Device Location Unit 141 may include a plurality of scheduling functions 123*a*-123*d*, each controlling one or more RF receivers #1-#4 103*a*-103*d*. For example, the plurality of scheduling functions may operate as follows:

- Independent operation: The scheduling functions 123*a*-123*d* operate independently but each of them is aware of the scheduling performed by the other functions.
- Coordinated operation: The scheduling functions 123*a*-123*d* operate in coordination with other scheduling functions. One of the scheduling functions may behave as a master function.

According to one embodiment, the scheduling functions 123*a*-123*d* in the receivers 123*a*-123*d* may operate in conjunction with a scheduling function 122 in the processing unit 102.

In one embodiment, the RF receivers #1-#4 103*a*-103*d* are separate units, each comprising the hardware means to receive and sample RF signals.

According to one embodiment, one of the RF receivers #1-#4 103*a*-103*d* is a wideband RF receiver able to receive simultaneously a large number of communication channels.

Figure 2A:
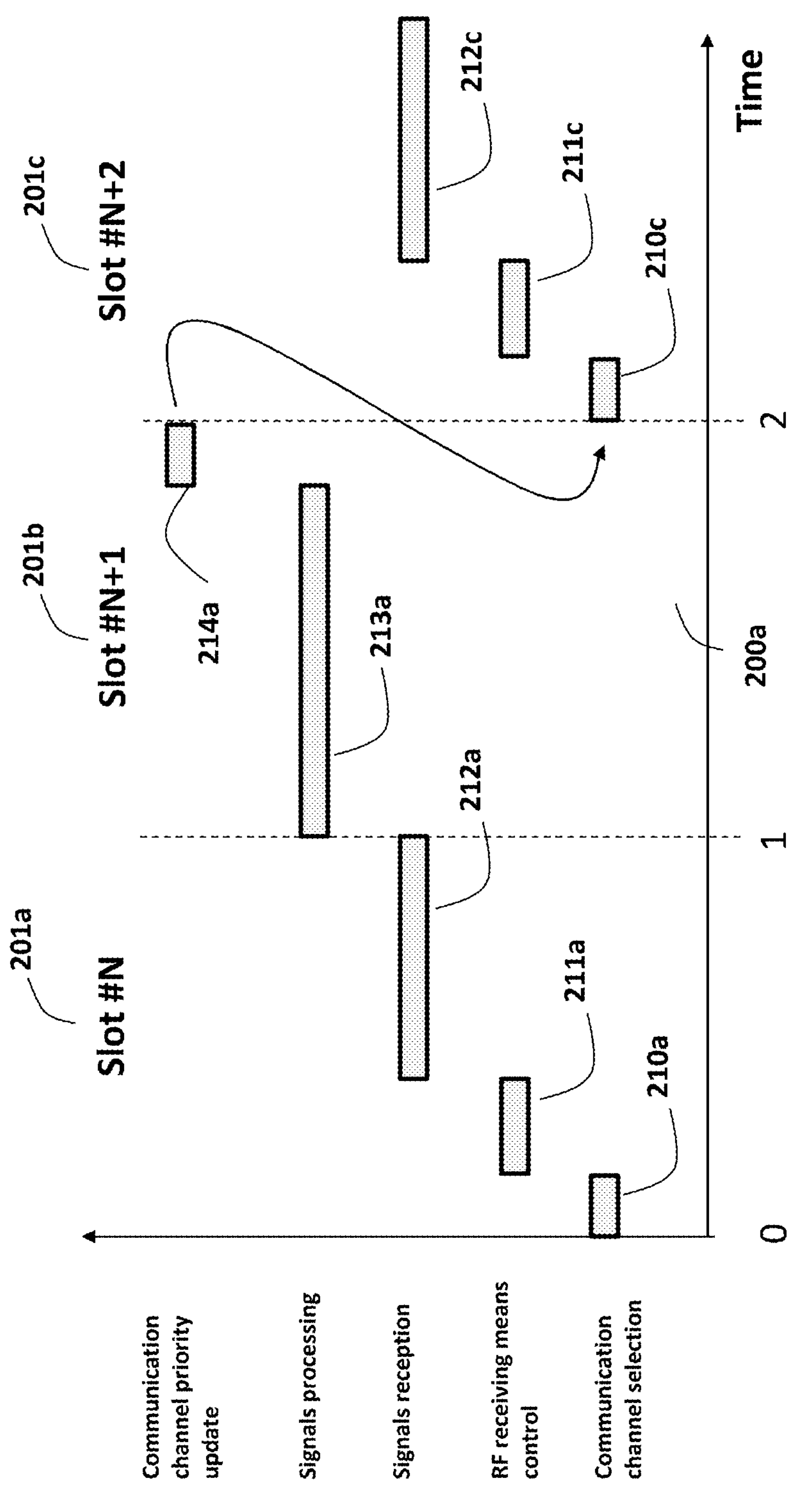
FIGS. 2A and 2B: Show exemplary timing diagrams of the scheduler operation in accordance with embodiments of the present invention.

Referring now to FIG. 2A, timing diagram 200*a* illustrates an exemplary operation of the scheduler operation 122 in accordance with an embodiment of the present invention.

The timing diagram 200*a* shows over time (x-axis) different scanning activities (y-axis). For the sake of simplicity, the diagram shows roughly representative elapsed times for each of the activities.

The timing diagram 200*a* shows the scheduling activities in three exemplary time slots 201*a*-201*c* which are denoted as Slot #n, Slot #n+1, and Slot n+2. According to one embodiment, the time slots 201*a*-201*c* have the same time length. According to another embodiment, the time slots 201*a*-201*c* have variable lengths. According to an embodiment, the length of the time slot 201*a*-201*c* is designed in accordance with the scanning activities, said time typically in the range of few hundreds of μsec (microseconds) to several msec (milliseconds).

According to an embodiment, the first scanning activity in time slot 201*a* is the selection of a communication channel

210a. According to one embodiment, the communication channel selection 210a is performed based on a scanning priority assigned to each communication channel According to one embodiment, the communication channel with the highest priority at the beginning of the time slot 201a is selected.

Once the communication channel to be scanned is selected 201a, the scheduler 122 may continue with the next step in the scanning process. According to one embodiment, the next activity may include controlling the RF receiver means 211a to collect signals in the selected communication channel 210a.

According to one embodiment, this step 211a may comprise: selecting an antenna 104a-104d, selecting an RF receiver 103, selecting a bandpass filter, programming the gain of the RF receiver, programming a synthesizer, programming a demodulator, programming a sampling clock, allocating memory to store the signal samples, programming the number of samples to be sampled, allocating buffers to process the signal, etc.

Once the Wireless Device Location Unit is ready to receive and sample signals in the selected communication channel, the process may continue with the next step. According to one embodiment, the next step may include receiving signals 212a in the selected communication channel. According to one embodiment, the received signals are split into I&Q signals and then sampled separately. According to one embodiment, all the samples are stored in a memory in the WDLU 101 for further processing.

According to one embodiment, the sampling rate may be programmed in accordance with the frequency bandwidth of the communication channel or the desired frequency band (e.g., 5 MHz, 10 MHz, 20 MHz, 50 MHz, etc.) and programming the number of samples to be collected (e.g., 256-2,048 samples) may also take in account the frequency resolution that will be further required during the signal processing.

According to one embodiment, when the reception of signals 212a is completed, the WDLU hardware may be available to collect signals from the same or another communication channel, while the previously collected signals 212a are being processed. According to one embodiment, and as shown in FIG. 2A, slot #N+1 201b does not comprise any additional signal reception.

The scanning process may continue with the processing of the signals 213a just received 212a. According to one embodiment, the received signal samples 212a are processed 213a to detect the presence of signals transmitted by wireless devices 110 in the volume, calculate different parameters and then locate the wireless device in the volume. According to one embodiment, processing the samples 213a may take one or more time slots (not shown in the current diagram 200a). In some cases, the samples contain only noise or random signals which do not require any additional processing while in other cases, the samples may comprise signals transmitted by a wireless device (e.g., a cellphone) 110 inside the volume. According to one embodiment, the scheduler 122 takes into account the required processing time to start scanning a new communication channel.

According to an embodiment, the signal processing 213a may calculate parameters that may be further used to calculate and update the scanning priority 214a of the selected communication channel 210a. According to one embodiment, at least two types of parameters may be used to calculate the new scanning priority 214a:

A parameter that was estimated as part of the signal processing.

A time-related parameter

According to one embodiment, the scheduler 122 may also reassign an updated priority 214a to other communication channels as well based on at least a time-related parameter, for example, the elapsed time between the last time slot in which a channel was scanned and the current time slot. According to one embodiment, the elapsed time may be weighted differently for different types of communication channels. This way, the scheduler 122 may scan some communication channels more frequently than others. According to one embodiment, the weights used may be pre-programmed or dynamically changed by processing elements in the WDLU 101.

According to one embodiment the update of the scanning priority 214a is learning-based, for example: (a) Based on the previous history (i.e., transmission characteristics) of the communication channel (b) Based on the statistical quality of the received signals 105 of a communication channel (i.e., the scheduler 122 may need to allocate less or more resources to locate wireless devices 110 operating in that communication channel), (c) Based on the motion characteristics of the wireless device inside the volume and (d) based on statistical parameters denoting the probability of the received signals 105 to be transmitted by a wireless device 110 in a certain area.

According to one embodiment after updating the scanning priority 214a to the selected communication channel 210a and other communication channels, the WDLU scheduler 122 may start scanning a new communication channel in slot #N+2 201c. The same scanning activities as explained for slot #N 201a maybe now be performed in slot #N+2 201c. This may include selecting a communication channel 210c, controlling the RF receiver 211c to collect signals in the selected communication channel 210c, receiving signals 212c in the selected communication channel 210c, and the other remaining scanning activities (not shown).

According to one embodiment, the scanning activities may continue indefinitely or until the WDLU is disabled or powered-off. According to one embodiment, the scanning priorities of the communication channels may be continuously updated in accordance with the signal detection and wireless device location processes.

Figure 2B:
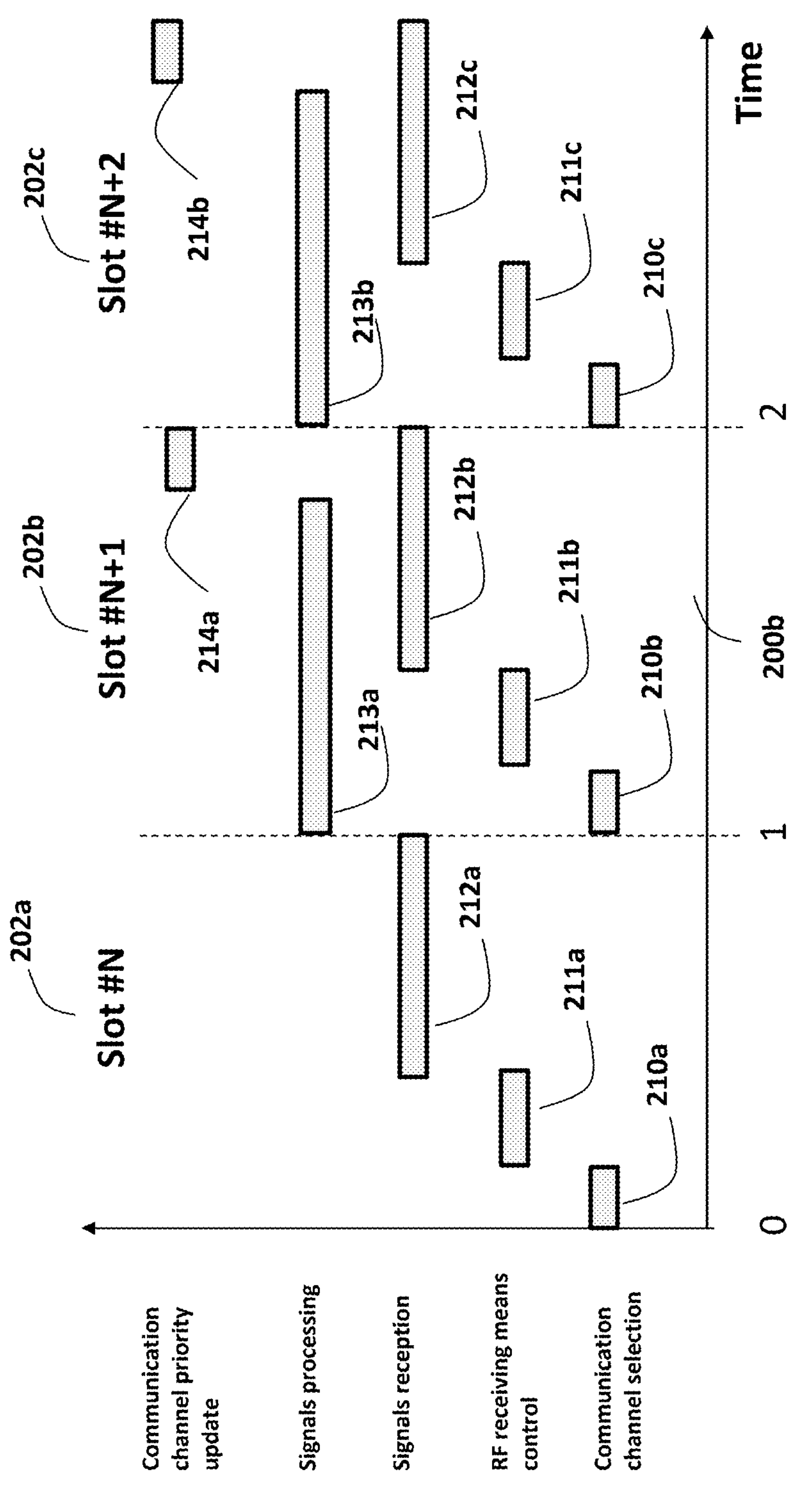

Referring now to FIG. 2B, timing diagram 200b illustrates an example of the scheduler operation 122 in accordance with an embodiment of the present invention.

The scanning activities 210a-212a in slot #N 202a, are as explained for the scanning activities 210a-212a in FIG. 2A above. According to one embodiment, as soon as the processing of signals 213a received 212a at time slot #N 202a starts, the scheduler 122 may continue, at time slot #N+1 202b, scanning the same or another communication channel (i.e., concurrently with the processing of signals received 212a in time slot #N 202a).

According to one embodiment, in time slot #N+1 202b, a communication channel is selected 210b. According to one embodiment, the selected communication channel 210b may be the same channel as selected 210a in the previous time slot (e.g., to continue sampling signals in the same communication channel), or a new channel comprising the same frequency band/channel but a new antenna (e.g., to collect signal from the same wireless device but with a different antenna), or a new channel comprising a new frequency channel but in the same frequency band (i.e., a frequency band may comprise several frequency channels, sometimes allocated to different cellular operators) or a new communication channel in a different frequency band. As may be apparent to the skilled in the art, many other options of the selected communication channel may also be implemented. According to one embodiment and as shown in slot #N+1 202*b*, signals are received 212*b* concurrently with the processing of signals 213*a* received 212*a* in a previous time slot. This improves the efficiency of the scanning process since it better utilizes the available scanning resources of the WDLU.

According to an embodiment, once a new scanning priority is assigned 214*a* to the selected communication channel 210*a* in slot #N 202*a* and the RF receiver completed the reception of signals 212*b* in slot #N+1 202*b*, the scheduler 122 may start the scanning of a new communication channel (i.e., activities 210*c*-212*c*). As may be seen in FIG. 2B, in slot N+2 202*c*, concurrently with the scanning of a new communication channel (i.e., activities 210*c*-212*c*), the WDLU processes 213*b* the signals received 212*b* in the previous time slot.

According to one embodiment, the scanning activities may continue indefinitely or until the WDLU is disabled or powered-off.

As may be apparent to the skilled in the art, when a plurality of scheduling functions 123*a*-123*d* is implemented (e.g., as in a Wireless Device Location Unit 141 and depicted in FIG. 1B), each scheduling function 123*a*-123*d* may operate as described in respect to FIG. 2A and FIG. 2B.

Figure 3:
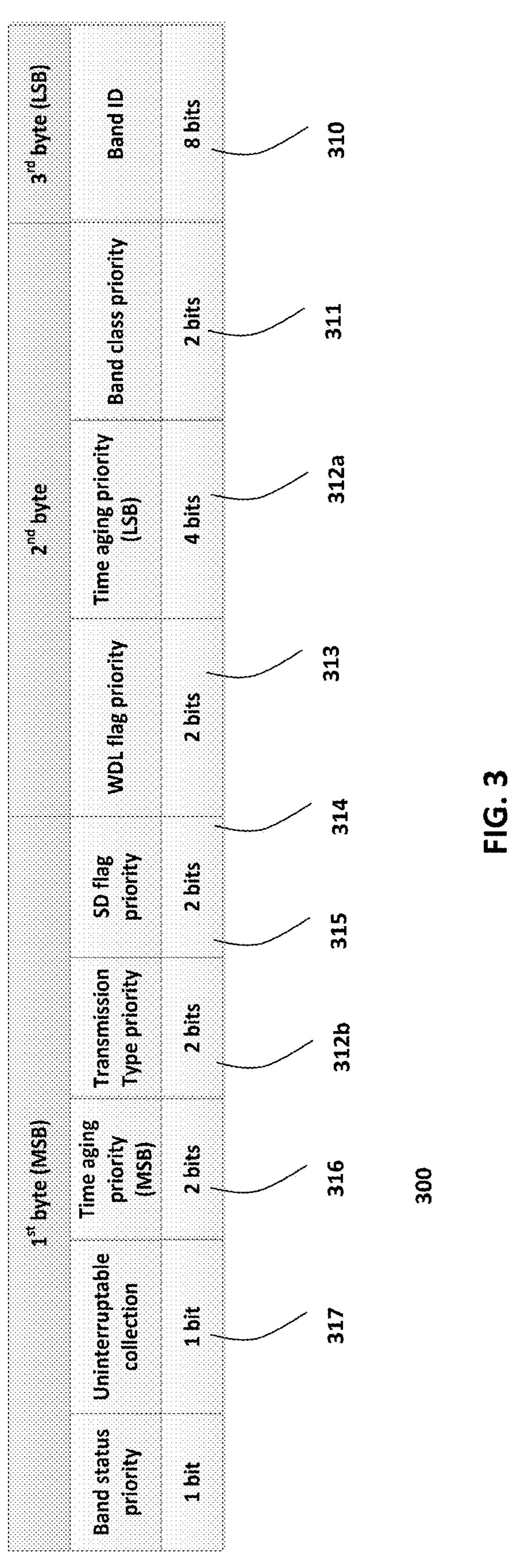
FIG. 3: Shows an exemplary diagram of the scanning priority parameter in accordance with an embodiment.

Referring now to FIG. 3 an exemplary diagram of the scanning priority parameter 300 in accordance with an embodiment is depicted.

According to an embodiment, a scanning priority parameter 300 is assigned to each communication channel. According to another embodiment, the antenna selection is excluded from the scanning priority parameter and handled separately by the scheduler 122.

According to an embodiment, the scanning priority parameter 300 is a 24-bit number comprising a plurality of fields 310-317 of different sizes and positioned differently in the priority parameter 300. As may be apparent to the skilled in the art, the position of a field 310-317 in the priority parameter 300 has an essential influence in the scanning process. For example, the value of a field 310 positioned in the least significant bit "LSB" part of the parameter 300 has a much lower influence than the value of a field 317 positioned in the most significant bit "MSB" part of the scanning priority parameter 300. According to an embodiment, the scanning priority parameter 300 is an N-bit number, wherein N=8 to 128.

According to an embodiment, the scanning priority parameter 300 may include the following fields:

- Band ID 310: This is a number assigned to each frequency band which the WDLU has to scan. Although this field 310 has the lowest influence on the frequency band selection, it allows having a different priority when all the other fields are exactly the same for two or more frequency bands.
- Band priority class 311: This is a number (e.g., 0-3) assigned to each frequency band (e.g., 3G, 4G, 5G, Wi-Fi, BLE, etc.). That way it's possible to prioritize the scanning of certain types of frequency bands (e.g., 4G or 5G).
- Time-aging priority 312*a*-312*b*: This is a field 312*a*-312*b* is a counter denoting the time which has elapsed between the current time and the last time that this frequency band was scanned (e.g., with any antenna). According to an embodiment, this counter is incremented at certain time slots if the frequency band is not scanned. Alternatively, this counter 312*a*-312*b* is decremented or cleared (i.e., set to zero) when the frequency band is scanned. According to one embodiment, the time-aging counter has a maximum value (e.g., per the number of bits), and once reached the counter cannot be further incremented.
  - According to one embodiment, the time aging field 312*a*-212*b* is split into two fields 312*a*-312*b* positioned at different positions in the priority parameter 300. That way, the scanning priority of a frequency band will significantly increase if the time-aging field 312*a*-312*b* reaches a certain threshold (i.e., Time aging field 312*b* provides higher priority to frequency bands not processed for a "long" time). Alternatively, it also allows sending to "sleep" for a long time, frequency bands that were recently scanned and there is no need to scan them again in a short time.
  - According to one embodiment, frequency bands may be configured to have normal or accelerated time aging to increase their scanning priority. For example, the time-aging counter of certain frequency bands may be incremented by a different increment factor (i.e., +1 to +4) and/or only incremented at different intervals (e.g., 1, 4, 8, 32, 64, 128, 512, and 1,024 msec). As may be apparent to the skilled in the art, a frequency band that has a scanning priority 300 incremented every 1 msec will be scanned more frequently than a frequency band that has a scanning priority 300 incremented every 128 msec. According to one embodiment, the increment factor and interval may be preassigned to each frequency band and/or dynamically modified during the WDLU operation (e.g., if the scanning history shows that there is almost no activity in a certain frequency band). According to one embodiment, the value of the time-aging field is set to a value greater than zero when the scheduler 122 is initialized or the frequency band is enabled.
  - As may be apparent to the skilled in the art, many other strategies may be used to handle the time-aging field 312*a*-312*b* during the scanning process. Those strategies may comprise, in addition to what was already mentioned, one or more of learning-based strategies (i.e., overall scanning history is analyzed and time-aging parameters redefined to one or more frequency bands), geographically-based strategies (i.e., time-aging of different frequency bands is handled in accordance with the geographical location of the volume), strategies maximizing the probability of signal detection, strategies minimizing the average time to scan a frequency band, strategies minimizing the time to locate a phone after a signal detection and many other strategies.
- WDL (Wireless Device Located) flag priority 313: This field 313 may denote whether or not a wireless device was recently located in this frequency band. According to an embodiment, the WDL flag priority field 313 may provide a different scanning priority to frequency bands in which a wireless device was recently located. For example, when the volume is a vehicle and inside that vehicle only a few (e.g., 1-2) wireless devices are active, the scheduler 122 may prefer to scan more frequently those frequency bands currently used by any of those wireless devices. In another embodiment, this field is used in the opposite way and provides priority to frequency bands in which wireless devices have not been located recently.

According to one embodiment, the value of this field may also denote the location inside the volume where the wireless device was located. For example, a frequency band in which a wireless device was located in the driver's seat will have a higher priority than a frequency band in which a wireless device was located in the passenger's seat. According to one embodiment, the value of this field 313 is subject to an aging mechanism that sets its value to default after some predetermined time (e.g., 1-60 seconds).

SD (Signal Detected) flag priority 314: This field 314 may denote whether or not a truly wireless device signal (e.g., a signal transmitted by a cellphone inside the volume) was detected in this frequency band. According to an embodiment, the SD flag priority field 313 may be set as soon as a signal is detected during the signal processing 213*a*-213*b* of a signal collection. As may be appreciated from the position of the SD flag priority field 313 in the scanning priority parameter 300, the scanning priority of a frequency band in which a signal was detected may be significantly increased. The rationale behind that is to "catch" transmitted signals with low time duration (e.g., few to tens of msec). In this case, once a signal is detected in a specific frequency band, the scheduler 122 will scan this band much more frequently (i.e., it has a higher scanning priority), and then the probability to receive more samples from that wireless device will increase.

According to one embodiment, a low value is set in this field when a signal collection has been processed and only noise or weak signals were found. That way, the scanning priority of that frequency band is decreased over other bands for them there is no information about the presence of transmitted signals. According to one embodiment, the value of this flag is continuously refreshed as soon as a signal collection in a frequency band is processed. According to one embodiment, the value of this field 314 is subject to an aging mechanism that sets its value to default after some predetermined time (e.g., 10 msec to 255 msec). According to one embodiment, after detecting a signal in a specific frequency band, the scheduler 122 may force the scanning process to continue scanning the same frequency band for a predetermined number of time slots (e.g., changing each time slot the receiving antenna).

According to one embodiment, the SD flag priority field 313 may be set in accordance with the probability that the signals transmitted in that frequency band were transmitted from a wireless device located in a predetermined area (e.g., driver's seat in a vehicle). According to one embodiment, this probability may be calculated based on the RSSI of the signals at each antenna 104*a*-104*d*. According to one embodiment, adaptive thresholds may be used to calculate this probability.

TT (Transmission Type) priority 315: This field 315 may provide different scanning priorities to different types of transmissions. For example, according to one embodiment, this field may have four different values wherein the following values may be assigned:

Value=3 (maximum) may be temporarily assigned to a frequency band in which a specific wireless device is expected to transmit. In this case, the scheduler 122 may provide a much higher priority to that frequency band over other channels in which sporadic signals may be present.

Value=2 may be assigned to a frequency band in which short sporadic signals (e.g., 4G cellular) may be transmitted.

Value=1 may be assigned to a frequency band in which long sporadic signals (e.g., 3G cellular) may be transmitted.

Value=0 (lowest priority) may temporarily be assigned to a frequency band for which the scheduler 122 has prior information that no transmitted signals are expected (e.g., by controlling the signal transmissions of cellphones in the volume).

Due to the high priority of this field, the scheduler 122 may efficiently handle the scanning of frequency band comprising temporarily different types of transmitted signals. According to one embodiment, the value of this field 315 is subject to an aging mechanism that sets its value to default (e.g., values 2 or 3) after some predetermined time (e.g., 100 msec to 2 sec).

According to one embodiment, the values assigned to this field 315 may be based on:

A frequency band used by a wireless device 110 that was probably located in a determined area (e.g., driver's seat).

The technology used in a specific frequency band (e.g., 3G/4G/5G).

The ability to control the wireless device 110 transmissions from the WDLU 101. Information regarding certain time windows used by the wireless devices 110 to transmit signals 105.

UI (Uninterruptible collection) flag 316: This flag 316 may allow the scheduler 122 to set the scanning priority of a frequency band to a value that cannot be surpassed by the priority of another frequency band. According to one embodiment, this flag may only be set to one frequency band at any given time. The scanning of the frequency band in which this flag was set will continue until the scheduler 122 changes it back to the default value (i.e., =0). According to one embodiment, this flag 315 may be a simple mechanism to extend the scanning time of a frequency band while maintaining the priority-based selection mechanism.

Sub-band status priority 317: This flag 317 denotes the scanning status of a frequency band. According to one embodiment, this flag is a one-bit length and equal to 1 if the scanning of the frequency band is enabled and equal to 0 if the scanning of the frequency band is disabled. As can be easily appreciated, the scheduler 122 may always give priority to the enabled frequency bands provided there is at least one enabled frequency band.

As may be apparent to the skilled in the art many other fields may be included in the scanning priority parameter 300 thus changing the scanning process in other ways. For example, and according to another embodiment, the following fields may also be included in the priority parameter 300:

Transmission window: Some signals are transmitted in short bursts at specified intervals (i.e., transmission frames). Once the timing of the transmission within the transmission frame is known, the scheduler 122 may use this field to change the priority of a frequency band when the transmission window time is approaching.

The remaining amount of signal collections to locate a wireless device: A field denoting the remaining amount of signal collections required to locate a phone in a specific frequency band. According to one embodiment, this field may be used to give priority to scan bands that require a small number of additional collections to locate a wireless device.

Communication channel statistical data.

Figure 4:
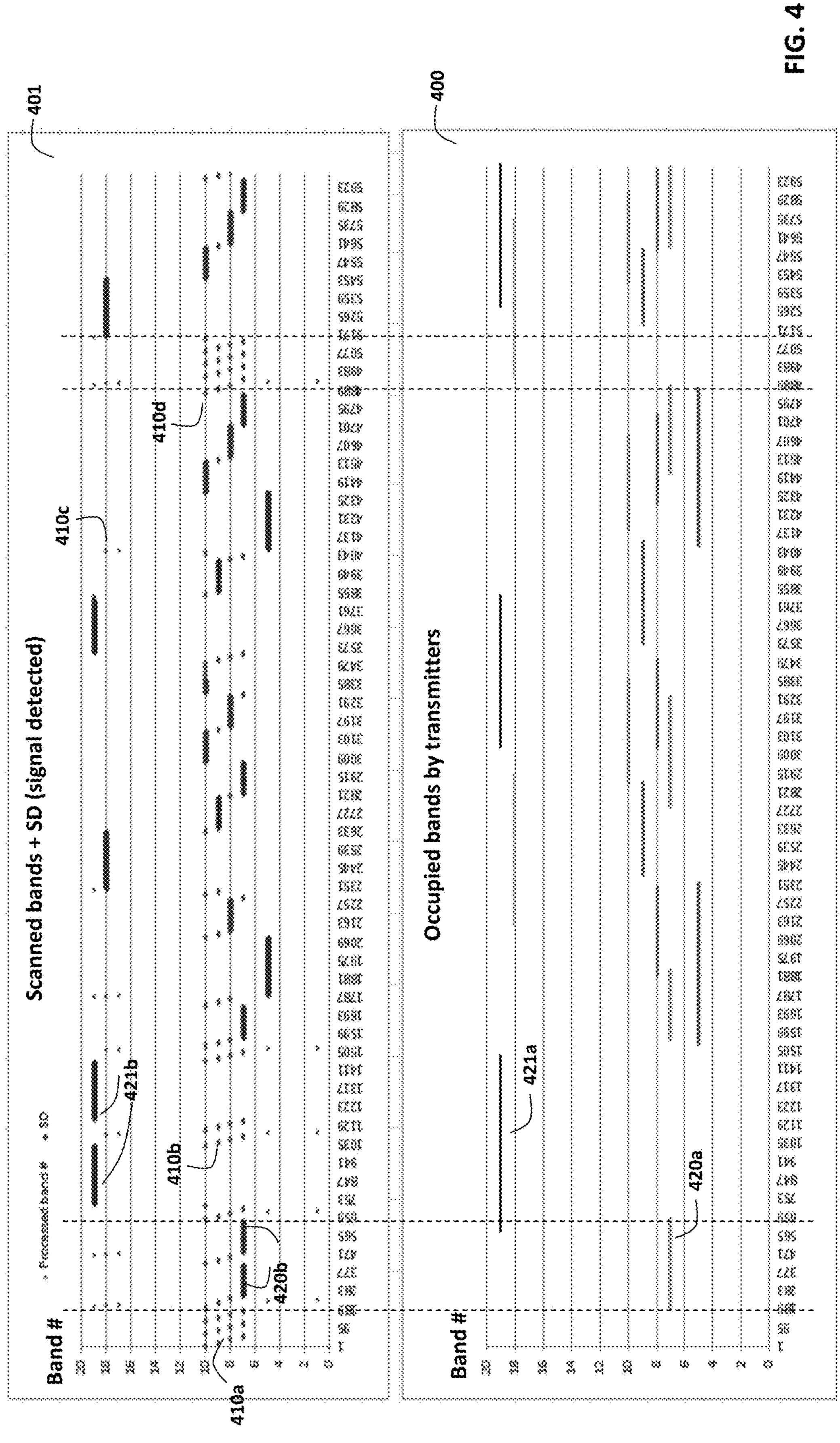
FIG. 4: Shows an exemplary timing diagram depicting the scheduler operation in accordance with an embodiment.

Referring now to FIG. 4, an exemplary timing diagram 400-401 of the scheduler 122 operation in accordance with an embodiment is depicted. In the depicted timing diagrams 400-401 each point in the x-axis denotes a time slot and the numbers in the y-axis denote the frequency band ID. For example, the upper timing diagram 401 shows the scheduler 122 operation over 5,923 time slots of 9 frequency bands (frequency band ID's: #1, #5, #7, #8, #9, #10, #17, #18 and #19).

The bottom timing diagram 400 simulates the occupancy (i.e., the time slots during which, signals were transmitted in those frequency bands) over time. The upper timing diagram 401 illustrates the frequency bands scanned by the scheduler 122 at each time slot and if a signal was detected in that frequency band (bold line).

For example, in the "Occupied frequency bands by Transmitters" timing diagram 400, it can be seen that a wireless device transmitted 420*a* in frequency band #7 between time slots 189-659. A frequency band is associated with a communication channel. Similarly, another wireless device transmitted 421*a* frequency band #19 approximately between time slots 570 and 1505. Later in this diagram 400 can be seen transmissions in frequency bands #5, #7, #8, #9, #10 and #19.

According to one embodiment, the "Scanned frequency bands+SD (signal detected)" timing diagram 401 illustrates the scheduler 122 operation assuming simulated frequency band occupancy as illustrated in the bottom diagram 400. For example, between time slots 1 and ~270, the scheduler 122 scans 410*a* frequency bands #7, #8, #9, and #10 which have higher priority than other frequency bands. Each frequency band (associated with a communication channel) is scanned during a short time (e.g., 16 time-slots) before another frequency band is scanned. Frequency bands #1, #5, #17, #18, and #19 are also scanned but with a lower priority.

Approximately in time slot #283, a signal is detected in frequency band #7. A transmitted signal was present 420*a* in this frequency band since time slot #189 but not detected until the scheduler 122 scanned frequency band #7. Once a signal was detected in frequency band #7 420*a* (bold line), frequency band #7 has a higher priority and the scanning in this channel continues until time slot ~420. At this time, the scanning is switched to other frequency bands, and then again, a signal is detected 420*b* in frequency band #7. A similar case is illustrated with respect to frequency band #19. Signals are transmitted 421*a* between time slots 570 and 1505, wherein those signals are detected 421*b* by the scanning process a short time after the transmission started.

At other times in this timing diagram 401, it can be seen how the scheduler 122 gives a clear priority to frequency bands (i.e., operating in different frequency bands) in which signals were detected. When no signals are detected, the scheduler 122 changes frequency bands more frequently 410*c*-410*d*.

Figure 5:
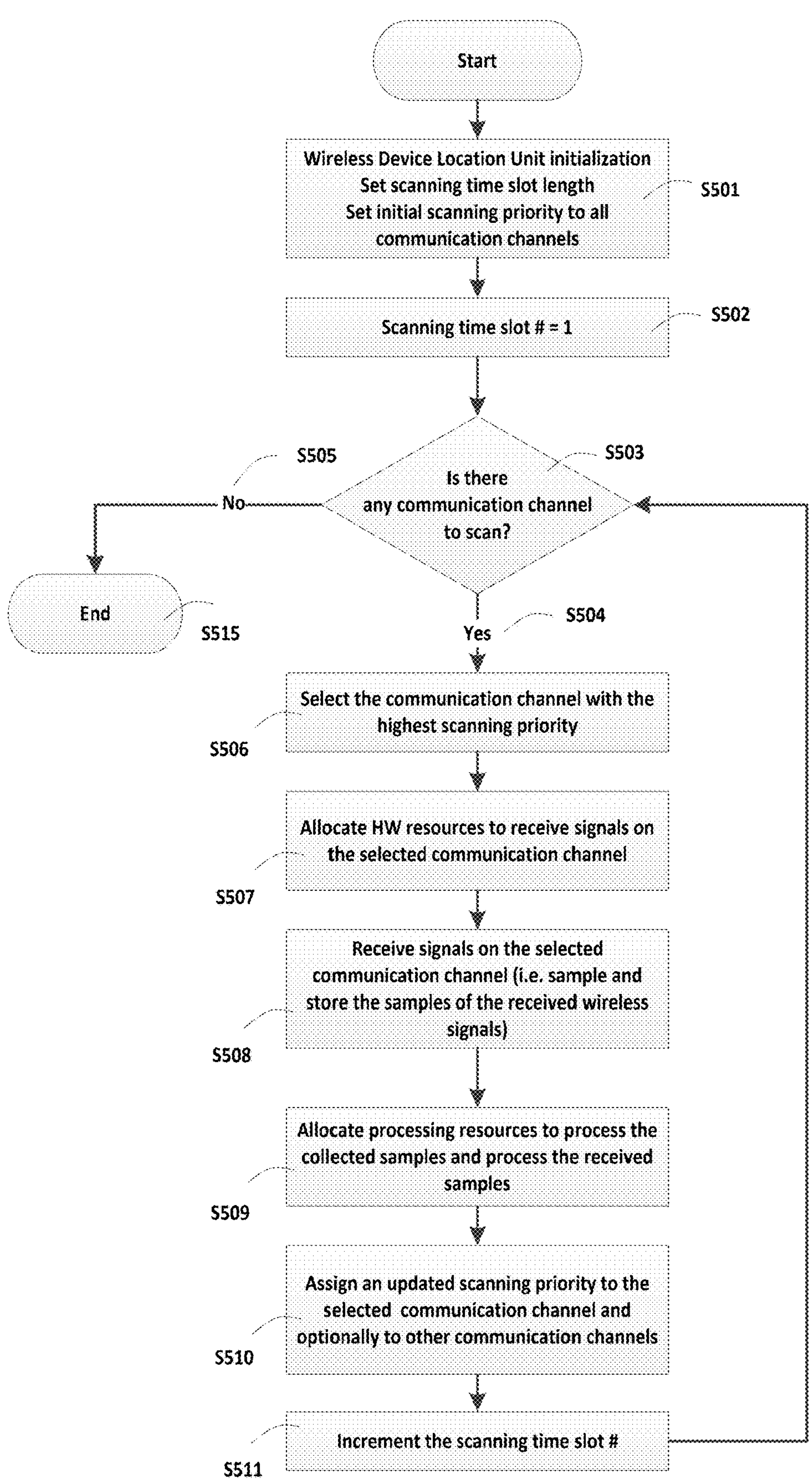
FIG. 5: Shows an exemplary flowchart of a first method for the scanning of communication channels in accordance with an embodiment.

Referring now to FIG. 5, an exemplary flowchart of a first method for scheduling the scanning of communication channels in accordance with an embodiment is depicted. The type, number, and arrangement of steps, actions, and elements illustrated in FIG. 5 may vary consistent with the disclosed embodiments. According to one embodiment, the Wireless Device Location Unit 101 may scan a plurality of communication channels and the scanning priority of a specific channel to be scanned at a specific time may be controlled by a scheduler 122 function.

According to one embodiment, the Wireless Device Location Unit 101 scanning flow 500 may start with the Wireless Device Location Unit 101 initialization S501. Typically, this step may be performed after powering-on the Wireless Device Location Unit 101 or hardware reset and in which the processing unit 102 initializes the hardware functions and firmware parameters. According to one embodiment, this step S501 further comprises initializing and starting the scheduler 122 operation which at least sets the time slot length and an initial scanning priority to all the frequency bands.

The next step S502 may include initializing and setting the scanning time slot counter to 1 (i.e., first time slot).

Once the Wireless Device Location Unit 101 is initialized, the process flow continues by checking if there is any communication channel to scan S503. If no communication channels shall be scanned S505, the scheduler 122 ends its operation S515. In a typical case, the scheduler 122 is programmed to scan at least one communication channel and the answer to the question is positive S504.

In step S506, and in accordance with one embodiment, the communication channel with the highest scanning priority is selected. According to one embodiment, each communication channel has at any given time, a scanning priority.

Once the communication channel to be scanned has been selected S506, the scheduler 122 allocates the required hardware resources to receive signals transmitted on that communication channel S507. According to one embodiment, this step may comprise: selecting an antenna 104*a*-104*d*, selecting an RF receiver 103, selecting a bandpass filter, programming the gain of the RF receiver, programming a synthesizer, programming a demodulator, programming a sampling clock, allocating memory to store the signal samples, programming the number of samples to be sampled, allocating buffers to process the signal, etc. According to one embodiment, a short collection of signal samples (e.g., 64 samples) may be performed before a full samples collection to allow the estimation of the signal strength and based on that, properly program the receiver gain for the full collection (e.g., to avoid overflow in the A/D converter). The sampling rate and the number of samples collected from each antenna 104*a*-104*d* may be programmable.

Once the required hardware resources were allocated S507, the scanning process proceeds with the reception of signals that may be transmitted by a wireless device in the selected communication channel S508. According to one embodiment, this step may include sampling the incoming signals in the selected communication channel(s). According to one embodiment, the received signals are split into I&Q signals and then sampled separately. According to one embodiment, all the samples are stored in a memory in the WDLU for further processing. In one embodiment, the processing unit 102 may sample I&Q signals at a rate of 38.4 MHz or 61.44 MHz and collect 2,048 samples from each antenna 104*a*-104*d*.

The next step in the process may include allocating processing resources to process the signal samples collected from the selected at least one communication channel and processing the received signals S509. In this step S509, the signal samples are processed to detect the presence of signals transmitted by wireless devices in the volume, calculate different parameters, and then locate the wireless device in the volume. According to one embodiment, processing the samples may take one or more time slots. In some cases, the samples contain only noise or random signals which do not require any additional processing while in other cases, the samples comprise signals transmitted by a wireless device 110 (e.g., a cellphone) inside the volume.

The next step in the process may include reassigning an updated priority to the selected communication channel S510 in accordance with the value of at least one parameter that was estimated by the processor and at least one time-related parameter. Optionally, this step S510 further comprises calculating and assigning the scanning priority to other communication channels as well. According to one embodiment, at least two types of parameters may be used to calculate the new scanning priority:

A parameter that was estimated as part of the signal processing. For example, presence/absence of a signal in the selected channel, the RSSI of the detected signal, the number of antennas in which this signal was recently detected, an indication of whether the detected signal belongs to a wireless device already located, or whether the detected signal belongs to a wireless device already located in a specific area (e.g., the driver's seat in a vehicle), the quality of the detected signal, etc.

A time-related parameter. For example, the minimum number of time slots to scan the channel if a signal is present or absent, the value of a counter counting the number of time slots since the scheduler 122 started scanning this communication channel, an external event which forces the scanning time to be extended (e.g., information that a wireless device will start transmitting shortly), alignment of the scanning time slot to specific cellular frames (e.g., 10 msec frames as used by LTE), the total amount of signal samples collections required to estimate the location of the wireless device in the volume (e.g., vehicle), etc.

The next step S511 may include incrementing the scanning time slot number. According to one embodiment, the slot number is incremented by 1.

The process flow then continues by checking again if there is any communication channel to scan S503. If the answer to the question is negative S505, the scheduler 122 ends its operation S515. Typically, this will not be the case and the answer to the question S503 will be positive S504 and the scanning process will continue as already described.

Figure 6:
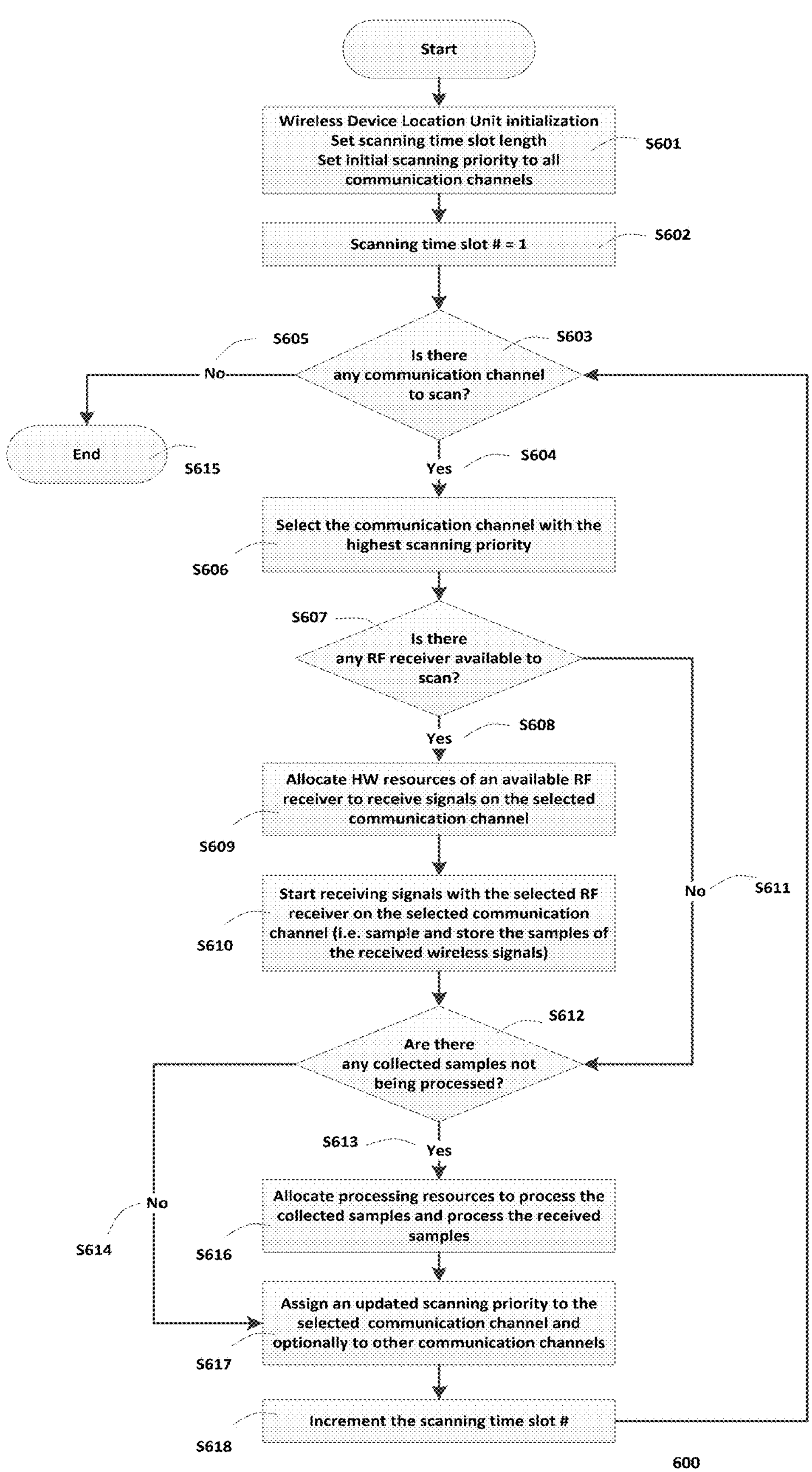
FIG. 6: Shows an exemplary flowchart of a second method for the scanning of communication channels in accordance with an embodiment.

Referring now to FIG. 6, an exemplary flowchart 600 of a second method for scheduling the scanning of communication channels in accordance with an embodiment is depicted. The type, number, and arrangement of steps, actions, and elements illustrated in FIG. 6 may vary consistent with the disclosed embodiments. According to one embodiment, the Wireless Device Location Unit 141 may scan a plurality of communication channels by a plurality of RF receivers 103*a*-103*d*, and the scanning priority of a specific communication channel to be scanned at a specific time may be controlled by a scheduler 122 function and/or a set of scheduling functions 123*a*-123*d*.

According to one embodiment, the Wireless Device Location Unit 141 scanning flow 600 may start with the Wireless Device Location Unit 141 initialization S601. Typically, this step may be performed after powering-on the Wireless Device Location Unit 141 or hardware reset and in which the processing unit 102 initializes the hardware functions and firmware parameters. According to one embodiment, this step S601 further comprises initializing and starting the scheduler operation which at least sets the time slot length and the initial scanning priority to all the communication channels.

The next step S602 may include initializing and setting the scanning time slot counter to 1 (i.e., first scanning time slot).

Once the Wireless Device Location Unit 141 is initialized, the process flow continues by checking if there is any communication channel to scan S603. If no communication channels shall be scanned S605, the scheduler ends its operation S615. In a typical case, the scheduler 122 is programmed to scan at least one communication channel and the answer to the question is positive S604.

In step S606 the communication channel with the highest scanning priority is selected in accordance with one embodiment. According to one embodiment, each communication channel has at any given time, a scanning priority.

Once the communication channel to be scanned has been selected S606, the scheduler 122 checks if there is any RF receiver 103*a*-103*d* available to scan. In one embodiment, the RF receivers 103*a*-103*d* may be allocated to perform scan operations longer than a single time slot and therefore one or more RF receivers 103*a*-103*d* may not be available at a given scanning time slot.

If the answer to the previous question is positive S608 (i.e., there is at least one RF receiver available for scanning), the scheduler 122 allocates the selected RF receiver and required hardware resources to receive signals transmitted on that communication channel S609. According to one embodiment, this step may comprise: selecting an antenna 104*a*-104*d*, selecting a bandpass filter, programming the gain of the selected RF receiver 103*a*-103*d*, programming a synthesizer, programming a demodulator, programming a sampling clock, allocating memory to store the signal samples, programming the number of samples to be sampled, allocating buffers to process the signal, etc. According to one embodiment, a short collection of signal samples (e.g., 64 samples) may be performed before a full samples collection to allow the estimation of the signal strength and based on that, properly program the receiver gain for the full collection (e.g., to avoid overflow in the A/D converter). The sampling rate and the number of samples collected from each antenna 104*a*-104*d* may be programmable.

Once the required hardware resources were allocated S609, the scanning process proceeds with the reception of signals that may be transmitted by a wireless device on the selected communication channel S610. According to one embodiment, this step may include sampling the incoming signals in the selected communication channel(s). According to one embodiment, the received signals are split into I&Q signals and then sampled separately. According to one embodiment, all the samples are stored in a memory in the WDLU for further processing. In one embodiment, the processing unit 102 may sample I&Q signals at a rate of 38.4 MHz or 61.44 MHz and collect 2,048 samples from each antenna 104*a*-104*d*.

Alternatively, if the answer to the question in S607 is negative S611 (i.e., there are no RF receivers available for scanning), the scheduler 122 checks if there are any collected samples not being processed yet S612. If the answer to this question is also negative S614, the scheduler 122 reassigns an updated priority to the selected communication channel (e.g., due to possible new info related to that communication channel) and optionally to other communication channels S617.

Once the reception of signals has been started in S610, the scheduler 122 checks if there are any collected samples not being processed yet S612. If the answer is negative, the scheduler 122 reassigns updated scanning priorities S617 as already described. Alternatively, if the answer is positive S613, the scheduler 122 assigns processing resources to process the signals received from the selected at least one communication channel and processes the received signals S616. In this step S616, the signal samples are processed to detect the presence of signals transmitted by wireless devices in the volume, calculate different parameters, and then locate the wireless device in the defined volume. According to one embodiment, processing the samples may take one or more time slots. In some cases, the samples contain only noise or random signals which do not require any additional processing while in other cases, the samples comprise signals transmitted by a wireless device 110 (e.g., a cellphone) inside the volume.

The next step in the process may include reassigning an updated scanning priority to the selected communication channel S617 in accordance with the value of at least one parameter that was estimated by the processor and at least one time-related parameter. Optionally, this step S617 further comprises calculating and assigning the scanning priority to other communication channels as well. According to one embodiment, at least two types of parameters may be used to calculate the new scanning priority:

A parameter that was estimated as part of the signal processing.

A time-related parameter.

The next step S618 may include incrementing the scanning time slot number. According to one embodiment, the slot number is incremented by 1.

The process flow then continues by checking again if there is any communication channel to scan S603. If the answer to the question is negative S605, the scheduler 122 ends its operation S615. Typically, this will not be the case and the answer to the question S603 will be positive S604 and the scanning process will continue as already described.

The apparatus of the present invention may include, according to certain embodiments of the invention, machine-readable memory containing or otherwise storing a program of instructions which, when executed by the machine, implements some or all of the apparatus, methods, features, and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may, wherever suitable, operate on signals representative of physical objects or substances.

The term "program" or "computer program" may include computer program code means for performing any of the methods shown and described herein when said program is run on at least one computer; and a computer program product, comprising a typically non-transitory-computer-usable or computer-readable medium, typically tangible, having a computer-readable program code embodied therein, said computer-readable program code adapted to be executed to implement any or all of the methods shown and described herein. The operations in accordance with the teachings herein may be performed by at least one computer specially constructed for the desired purposes or a general-purpose computer specially configured for the desired purpose by at least one computer program stored in atypically non-transitory computer-readable storage medium. The term "non-transitory" is used herein to exclude transitory, propagating signals or waves, but to otherwise include any volatile or non-volatile computer memory technology suitable to the application.

Any suitable processor/s, display, and input means may be used to process, display e.g., on a computer screen or other computer output device, store, and accept information such as information used by or generated by any of the methods and apparatus that are shown and described herein: the above processor/s, display, and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation, or other programmable device or computer or electronic computing device or processor, either general-purpose or specifically constructed, used for processing; a computer display screen and/or printer and/or speaker for displaying; machine-readable memory such as optical disks, CDROMs, DVDs, Blu-ray, magnetic-optical discs or other discs; RAMs, ROMs, EPROMs, EEPROMs, Flash memories, magnetic or optical or other cards, for storing, and keyboard or mouse for accepting. Modules shown and described herein may include any one or combination or a plurality of a server, a data processor, a memory/computer storage, a communication interface, a computer program stored in memory/computer storage.

The term "process" as used in this application is intended to include any type of computation or manipulation or transformation of data represented as physical, e.g., electronic, phenomena which may occur or reside e.g., within registers and/or memories of at least one computer or processor. The term processor includes a single processing unit or a plurality of distributed or remote such units.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "calculating", "determining", "generating", "reassessing", "classifying", "generating", "producing", "registering", "detecting", "associating", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" or "processor" should be broadly construed to cover any kind of electronic device with data processing capabilities, including, by way of non-limiting example, personal computers, servers, a computing system, communication devices, processors (e.g., digital signal processor (DSP), microcontrollers, field-programmable gate array (FPGA), application-specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectively (e.g., a user may configure or select whether the element or feature does or does not exist). Any suitable input device, such as but not limited to a sensor, may be used to generate or otherwise provide information received by the apparatus and methods shown and described herein.

The principles of the invention, wherever applicable, are implemented as hardware, firmware, software, or any combination thereof. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. The circuits described hereinabove may be implemented in a variety of manufacturing technologies well known in the industry including but not limited to integrated circuits (ICs) or SIP (system on chip) and discrete components that are mounted using surface mount technologies (SMT), and other technologies. The scope of the invention should not be viewed as limited by the types of packaging and physical implementation of the Wireless Device Location Unit 201.

All examples and conditional language recited herein are intended for pedagogical purposes to aid the reader in understanding the principles of the invention and the concepts contributed by the inventor to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for allocating receiving and processing resources for scanning communication channels over a scanning time, the method carried out by a wireless device location unit, operable within a system for controlling functionalities of at least one wireless device located within a defined volume, wherein said wireless device location unit comprises a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels, and wherein the RF receiver is capable of simultaneously receiving a second number of communication channels which is smaller than the first number of communication channels;

said method comprising:

(a) dividing the scanning time into time slots, wherein at each time slot, allocating the RF receiver to receive signals in a channel selected from the first number of communication channels, and allocating the processor to process signals received in an earlier time slot;

(b) assigning a scanning priority to each of the first number of communication channels;

(c) scanning, by the wireless device location unit, in accordance with the assigned scanning priority, at least one of said second number of communication channels, to detect and process RF signals transmitted by the at least one wireless device;

(d) processing, by the processor, the received signals and assigning an updated scanning priority to at least one of the first number of communication channels, wherein the assigned scanning priority is dynamically modifiable by the processor; and (e) repeating steps (c) and (d) with the updated scanning priority, wherein the wireless device location unit has information regarding a time window in which the wireless device transmits the coordinated signals following the request from the wireless device location unit and also comprises information about one or more characteristics of at least one communication channel used by the wireless device to transmit the coordinated signals, and wherein the scanning priority assigned to said at least one communication channel during the time window is higher than the priority assigned to other communication channels.

2. The method of claim 1, wherein the reception by the wireless device location unit of the coordinated signals transmitted by the wireless device and said information is used by the wireless device location unit to identify said transmitted signals transmitted by said wireless device.

3. A method for allocating receiving and processing resources for scanning communication channels over a scanning time, the method carried out by a wireless device location unit, operable within a system for controlling functionalities of at least one wireless device located within a defined volume, wherein said wireless device location unit comprises a radio frequency "RF" receiver operative to scan and receive signals transmittable by the at least one wireless device located within the defined volume, the RF receiver further connected to a plurality of antennas and further connected to a processor operative to process received signals, wherein the at least one wireless device transmits signals on at least one communication channel, selected from a first number of communication channels, and wherein the RF receiver is capable of simultaneously receiving a second number of communication channels which is smaller than the first number of communication channels;

said method comprising:

(f) dividing the scanning time into time slots, wherein at each time slot, allocating the RF receiver to receive signals in a channel selected from the first number of communication channels, and allocating the processor to process signals received in an earlier time slot;

(g) assigning a scanning priority to each of the first number of communication channels;

(h) scanning, by the wireless device location unit, in accordance with the assigned scanning priority, at least one of said second number of communication channels, to detect and process RF signals transmitted by the at least one wireless device;

(i) processing, by the processor, the received signals and assigning an updated scanning priority to at least one of the first number of communication channels, wherein the assigned scanning priority is dynamically modifiable by the processor; and (j) repeating steps (c) and (d) with the updated scanning priority, wherein the RF receiver comprises at least one RF receiver chain operative to receive signals in a selected communication channel and wherein the number of said at least one RF receiver chains is smaller than the number of said plurality of antennas; and wherein said receiving is performed by connecting at least one of the plurality of antennas to at least one of the RF receiver chains, wherein the RF receiver comprises a plurality of RF receiver chains, each receiver chain operative to receive RF signals in a selected communication channel and wherein the wireless device location unit is operative to simultaneously scan a plurality of communication channels selected from the second number of the communication channels.

4. The method of claim 3, wherein the scanning by each of the RF receiver chains is performed independently from the scanning of the other RF receiver chains or in coordination therewith.

5. The method of claim 3, wherein at least one of the RF receiver chains is a wideband RF receiver chain configured to simultaneously receive a plurality of communication channels and wherein the scanning priorities of at least two of the communication channels are assigned based on the processing of the signals received by said wideband RF receiver chain.

* * * * *